(12) United States Patent
Beck et al.

(10) Patent No.: US 10,570,995 B2
(45) Date of Patent: Feb. 25, 2020

(54) TRANSMISSION FOR A MOTOR VEHICLE

(71) Applicant: ZF Friedrichshafen AG, Friedrichshafen (DE)

(72) Inventors: Stefan Beck, Eriskirch (DE); Michael Wechs, Weißensberg (DE); Martin Brehmer, Tettnang (DE); Johannes Kaltenbach, Friedrichshafen (DE); Eckehard Münch, Bünde (DE); Viktor Warth, Friedrichshafen (DE); Julian King, Rankweil (AT); Jens Moraw, Friedrichshafen (DE); Stephan Scharr, Friedrichshafen (DE); Matthias Horn, Tettnang (DE); Uwe Griesmeier, Markdorf (DE); Peter Ziemer, Tettnang (DE); Juri Pawlakowitsch, Kressbronn (DE); Bernd Knöpke, Salem (DE); Gerhard Niederbrucker, Friedrichshafen (DE); Raffael Kuberczyk, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 166 days.

(21) Appl. No.: 15/744,424

(22) PCT Filed: Jun. 21, 2016

(86) PCT No.: PCT/EP2016/064234
§ 371 (c)(1),
(2) Date: Jan. 12, 2018

(87) PCT Pub. No.: WO2017/012808
PCT Pub. Date: Jan. 26, 2017

(65) Prior Publication Data
US 2018/0202520 A1    Jul. 19, 2018

(30) Foreign Application Priority Data

Jul. 21, 2015 (DE) .................. 10 2015 213 664

(51) Int. Cl.
*F16H 3/44* (2006.01)
*F16H 3/66* (2006.01)
(Continued)

(52) U.S. Cl.
CPC ............. *F16H 3/663* (2013.01); *B60K 6/365* (2013.01); *B60K 6/48* (2013.01); *B60K 6/547* (2013.01);
(Continued)

(58) Field of Classification Search
CPC . F16H 3/44; F16H 3/663; F16H 3/725; F16H 2200/2007; F16H 2200/2043;
(Continued)

(56) References Cited

U.S. PATENT DOCUMENTS

| 6,093,974 A | 7/2000 | Tabata et al. |
| 2007/0117678 A1 | 5/2007 | Fukushima et al. |

(Continued)

FOREIGN PATENT DOCUMENTS

| DE | 4110218 A1 | 10/1992 |
| DE | 19606771 A1 | 8/1997 |

(Continued)

OTHER PUBLICATIONS

German Search Report DE102015213664.7, dated Mar. 9, 2016. (7 pages).

(Continued)

*Primary Examiner* — Edwin A Young
(74) *Attorney, Agent, or Firm* — Dority & Manning, P.A.

(57) ABSTRACT

A transmission (G) for a motor vehicle includes a drive shaft (GW1), an output shaft (GW2), a first and a second planetary
(Continued)

gear set (P1, P2), and a first, second, third, fourth and fifth shift element (04, 13, 14, 26, 36). Six forward gear ratios (1-6) between the drive shaft (GW1) and the output shaft (GW2) are engagable through selective pairwise closure of the five shift elements (04, 13, 14, 26, 36) and rotationally fixed immobilization of the sun gear (E11) of the first planetary gear set (P1).

16 Claims, 22 Drawing Sheets

(51) Int. Cl.
*B60K 6/365* (2007.10)
*B60K 6/48* (2007.10)
*B60K 6/547* (2007.10)

(52) U.S. Cl.
CPC ............... *B60K 2006/4825* (2013.01); *F16H 2200/006* (2013.01); *F16H 2200/0052* (2013.01); *F16H 2200/0086* (2013.01); *F16H 2200/0091* (2013.01); *F16H 2200/2007* (2013.01); *F16H 2200/2048* (2013.01); *F16H 2200/2064* (2013.01); *F16H 2200/2094* (2013.01); *F16H 2200/2097* (2013.01)

(58) Field of Classification Search
CPC ..... F16H 2200/2046; F16H 2200/2048; F16H 2200/2051
See application file for complete search history.

(56) References Cited

U.S. PATENT DOCUMENTS

| | | |
|---|---|---|
| 2007/0142158 A1 | 6/2007 | Baldwin |
| 2007/0270262 A1 | 11/2007 | Raghavan et al. |
| 2011/0009229 A1* | 1/2011 | Bauknecht .............. F16H 3/66 475/275 |
| 2011/0314960 A1* | 12/2011 | Yoshimura ............ B60K 6/445 74/650 |
| 2013/0045826 A1 | 2/2013 | Wittkopp et al. |
| 2014/0128202 A1* | 5/2014 | Lee ........................ F16H 3/66 475/282 |
| 2014/0335997 A1 | 11/2014 | Hiraiwa |
| 2015/0065290 A1* | 3/2015 | Ziemer .................... F16H 3/44 475/271 |
| 2016/0201769 A1 | 7/2016 | Scholle et al. |

FOREIGN PATENT DOCUMENTS

| | | |
|---|---|---|
| DE | 69919925 T2 | 9/2005 |
| DE | 102006055282 A1 | 5/2007 |
| DE | 102012214266 A1 | 2/2013 |
| DE | 102013005949 A1 | 10/2013 |
| DE | 102013013947 A1 | 2/2015 |
| DE | 102014222153 A1 | 5/2016 |

OTHER PUBLICATIONS

International Search Report (English Translation) PCT/EP2016/064234, dated Aug. 11, 2016. (2 pages).

* cited by examiner

| | 04 | 05 | 13 | 14 | 15 | 26 | 36 |
|----|----|----|----|----|----|----|----|
| R2 | x  |    |    |    | x  | x  |    |
| R1 | x  |    |    |    | x  |    | x  |
| 1  | x  | x  | x  |    |    |    |    |
| 2  |    | x  | x  |    |    | x  |    |
| 3  |    | x  | x  |    |    |    | x  |
| 4  |    | x  | x  | x  |    |    |    |
| 5  |    | x  |    | x  |    |    | x  |
| 6  |    | x  |    | x  |    | x  |    |

Fig. 2

|    | 04 | 13 | 14 | 26 | 36 |
|----|----|----|----|----|----|
| 1  | x  | x  |    |    |    |
| 2  |    | x  |    | x  |    |
| 3  |    | x  |    |    | x  |
| 4  |    | x  | x  |    |    |
| 5  |    |    | x  |    | x  |
| 6  |    |    | x  | x  |    |

Fig. 5

|  | 04 | 13 | 14 | 26 | 36 |
|---|---|---|---|---|---|
| 1 | x | x |  |  |  |
| 2 |  | x |  | x |  |
| 3 |  | x |  |  | x |
| 4 |  | x | x |  |  |
| 5 |  |  | x | x | x |
| 6 |  |  | x |  |  |
| EDA |  |  | x |  |  |
| E1 | x |  |  |  |  |
| E2 |  |  |  | x |  |
| E3 |  |  |  |  | x |

|    | 04 | 05 | 13 | 14 | 15 | 26 | 36 |
|----|----|----|----|----|----|----|----|
| R2 | x  |    |    |    |    |    |    |
| R1 | x  |    |    |    | x  | x  |    |
| 1  | x  |    |    |    | x  |    |    |
| 2  |    | x  | x  |    |    | x  |    |
| 3  |    | x  | x  |    |    |    |    |
| 4  |    | x  | x  | x  |    |    |    |
| 5  |    | x  | x  | x  |    |    | x  |
| 6  |    | x  |    | x  |    | x  | x  |
| EDA|    | x  |    | x  |    |    | x  |
| E1 | x  | x  |    |    |    |    |    |
| E2 |    | x  |    |    |    | x  |    |
| E3 |    | x  |    |    |    |    | x  |

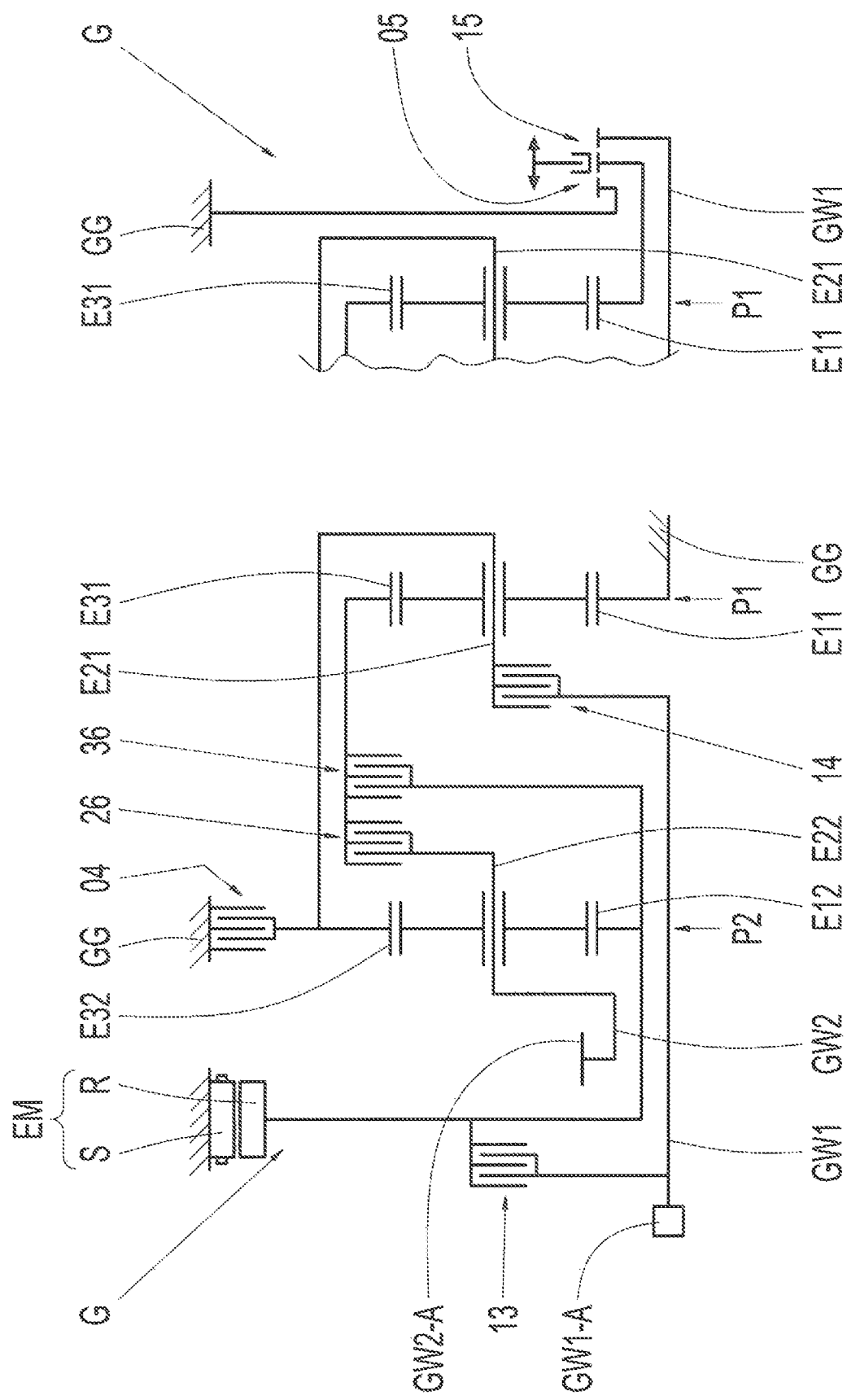

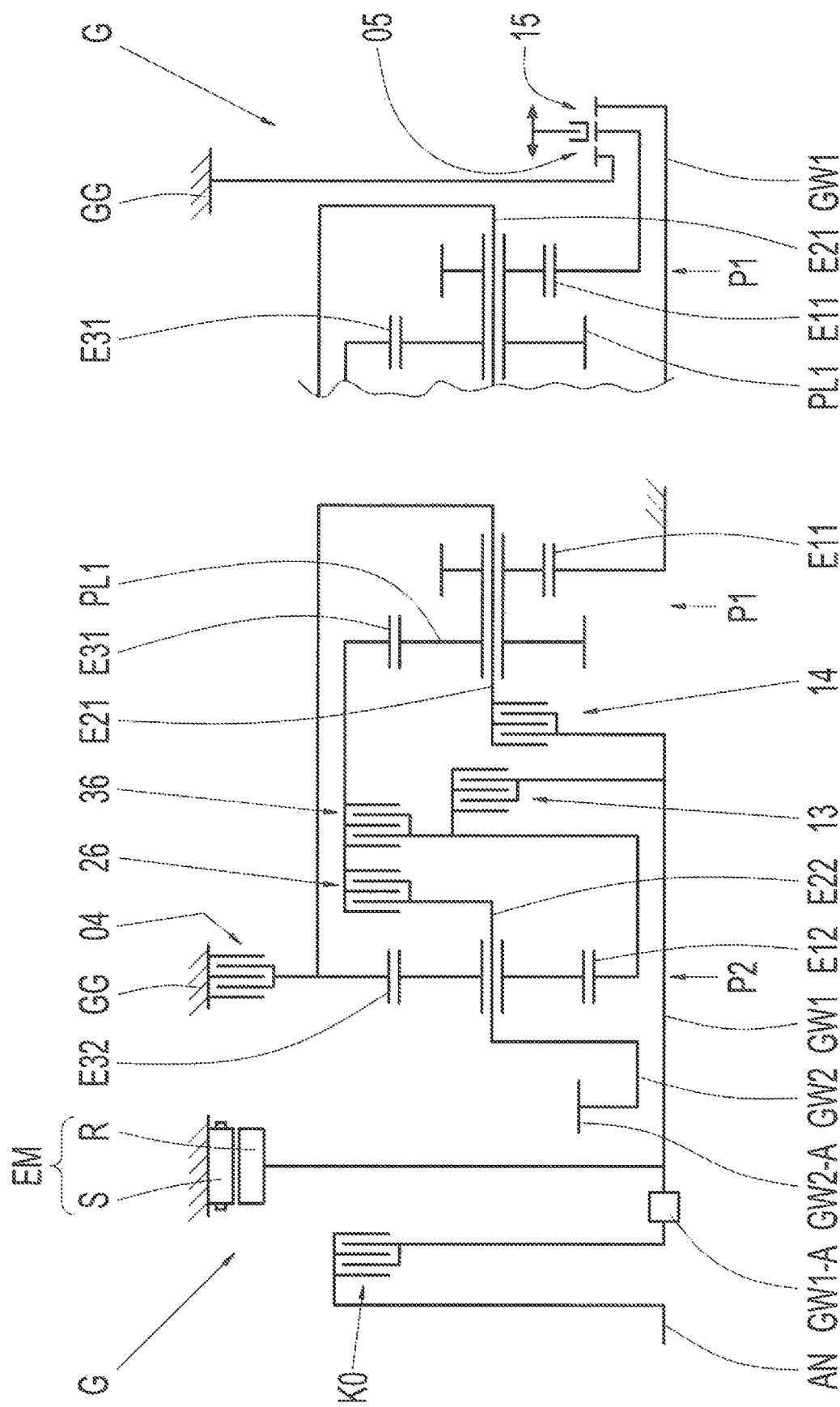

|     | 04 | 13 | 14 | 15b | 26 | 36 |
|-----|----|----|----|-----|----|----|
| R3b |    |    |    | x   | x  |    |
| R2b |    | x  |    | x   |    | x  |
| R1b | x  | x  |    | x   |    |    |
| 1   |    | x  |    |     |    |    |
| 2   |    | x  |    |     | x  |    |
| 3   |    | x  |    |     |    |    |
| 4   |    | x  | x  |     |    | x  |
| 5   |    |    | x  |     |    | x  |
| 6   |    |    | x  |     | x  | x  |

|      | 04 | 13 | 14 | 15b | 26 | 27 | 36 |
|------|----|----|----|-----|----|----|----|
| R3b  |    |    |    | x   | x  |    |    |
| R2b  |    |    |    | x   |    |    | x  |
| R1b  |    | x  |    | x   |    |    |    |
| 1b   | x  | x  |    |     |    |    |    |
| 2b   |    | x  |    |     | x  |    |    |
| 3b   |    | x  |    |     |    | x  |    |
| 4b   |    | x  |    |     |    |    |    |
| 5b   |    | x  | x  |     |    |    | x  |
| 6b   |    |    | x  |     |    |    | x  |
| 7b   |    |    | x  |     |    | x  |    |
| 8b   |    |    | x  |     | x  |    |    |

TRANSMISSION FOR A MOTOR VEHICLE

FIELD OF THE INVENTION

The invention generally relates to a transmission for a motor vehicle.

BACKGROUND

The applicant's patent application DE 10 2014 222 153.6, which has not yet been published, describes a transmission, which has three planetary gear sets and four shift elements. Five forward gear ratios between an input shaft and an output shaft can be engaged through selective pairwise closure of the four shift elements.

With a high number of forward gear ratios, it is possible, with a similar or even greater overall spread of the transmission, to provide smaller ratio steps, which promote fuel-efficient operation of a motor vehicle with an internal combustion engine. However, with an increased number of forward gear ratios, the effort involved in the construction of the transmission, and thus also the weight and production costs, are increased.

SUMMARY OF THE INVENTION

An object of the invention is to provide a transmission which can provide at least six forward gear ratios between a drive shaft and an output shaft, and the construction of which at the same time involves relatively little effort.

Herein, a transmission refers in particular to a multi-ratio transmission in which a multiplicity of gear ratios, that is to say fixed transmission ratios, between two shafts of the transmission can be selected, preferably in automatic fashion, by shift elements. The shift elements are in this case for example clutches or brakes. Such transmissions are used in particular in motor vehicles for the purposes of suitably adapting the rotational speed and torque output characteristics of the drive unit to the driving resistances of the vehicle.

The transmission according to the invention has a drive shaft, an output shaft, two planetary gear sets, and five shift elements. A planetary gear set includes a sun gear, a carrier and a ring gear. Planet gears are rotatably mounted on the carrier, which planet gears mesh with the toothing of the sun gear and/or with the toothing of the ring gear. A negative or minus gear set refers to a planetary gear set with a carrier on which the planet gears are rotatably mounted, having a sun gear and having a ring gear, wherein the toothing of at least one of the planet gears meshes both with the toothing of the sun gear and with the toothing of the ring gear, whereby the ring gear and the sun gear rotate in opposite directions of rotation when the sun gear rotates in the presence of a static carrier. A positive or plus gear set differs from the minus planetary gear set described directly above in that the plus gear set has inner and outer planet gears which are mounted rotatably on the carrier. The toothing of the inner planet gears meshes in this case at one side with the toothing of the sun gear and at the other side with the toothing of the outer planet gears. The toothing of the outer planet gears furthermore meshes with the toothing of the ring gear. This has the result that, in the presence of a static carrier, the ring gear and the sun gear rotate in the same direction of rotation.

According to the invention, a carrier of the first planetary gear set is permanently connected to a ring gear of the second planetary gear set. The output shaft is permanently connected to a carrier of the second planetary gear set. The carrier of the first planetary gear set, and thus also the ring gear, which is connected to said carrier, of the second planetary gear set, can be rotationally fixedly immobilized by closing the first shift element. The drive shaft is connectable to a sun gear of the second planetary gear set by closing the second shift element. The drive shaft is connectable to the carrier of the first planetary gear set, and thus also to the ring gear of the second planetary gear set, by closing the third shift element. A ring gear of the first planetary gear set is connectable to the output shaft, and thus also to the carrier of the second planetary gear set, by closing the fourth shift element. The ring gear of the first planetary gear set is connectable to the sun gear of the second planetary gear set by closing the fifth shift element. A sun gear of the first planetary gear set is either permanently rotationally fixedly immobilized or can switchably be rotationally fixedly immobilized.

A transmission having above described arrangement of components has a compact design, low component loads, and good toothing efficiency. Furthermore, through the use of only two planetary gear sets, the effort involved in constructing a transmission with six forward gear ratios is low.

At least six forward gear ratios between the drive shaft and the output shaft can be engaged through selective closure of two of the five shift elements. The first forward gear ratio is formed by closing the first shift element and the second shift element. The second forward gear ratio is formed by closing the second shift element and the fourth shift element. The third forward gear ratio is formed by closing the second shift element and the fifth shift element. The fourth forward gear ratio is formed by closing the second shift element and the third shift element. The fifth forward gear ratio is formed by closing the third shift element and the fifth shift element. The sixth forward gear ratio is formed by closing the third shift element and the fourth shift element. The sun gear of the first planetary gear set must be rotationally fixedly immobilized in each of the six forward gear ratios. In this way, with suitable selection of the fixed carrier transmission ratios of the planetary gear sets, a transmission series which is highly suited to use in the motor vehicle is achieved. Furthermore, two adjacent forward gear ratios always have one shift element which is closed in both of these gear ratios. This simplifies the shift process and shortens the shift duration between adjacent forward gear ratios. Since the second shift element is closed in the first to fourth forward gear ratios, the engagement sequence diagram permits such a simplified shift process between each of the first four forward gear ratios. This also applies to a shift process between the forward gear ratios four and six, because the third shift element is closed in these gear ratios.

In principle, each of the five shift elements may be formed as a positively locking shift element, that is to say for example as a dog clutch, or as a frictionally locking shift element, that is to say for example as a multiplate clutch. The first and/or the second shift element are preferably formed as positively locking shift elements. Positively locking shift elements produce the connection in the closed state by positive locking, and are distinguished by lower drag losses in the open state than frictionally locking shift elements. The efficiency of the transmission is improved by the low drag losses in the open state, in particular because the first shift element is closed only in the first of the six forward gear ratios. Therefore, the first shift element is predominantly open during the operation of the transmission in the drivetrain of a motor vehicle.

According to a first embodiment, external interfaces of the drive shaft and of the output shaft are arranged coaxially with respect to one another and at opposite axial ends of the transmission. Here, the second planetary gear set of the two planetary gear sets has the greater axial spacing to the external interface of the drive shaft. Such an arrangement is suitable in particular for the use of the transmission in a motor vehicle with a drivetrain oriented parallel to the direction of travel of the motor vehicle.

In a second embodiment, external interfaces of the drive shaft and of the output shaft are arranged coaxially with respect to one another and at the same axial end of the transmission. Here, the second planetary gear set of the two planetary gear sets has the shorter axial spacing to the external interface of the drive shaft. The external interface of the output shaft has a toothing which meshes with a toothing of a shaft arranged axially parallel to the main axis of the transmission. For example, the axle differential of a drivetrain may be arranged on said shaft. Such an arrangement is suitable in particular for the use of the transmission in a motor vehicle with a drivetrain oriented transversely with respect to the direction of travel of the motor vehicle.

In one possible embodiment, the transmission has an electric motor or machine with a rotatable rotor and a rotationally fixed stator. Here, the rotor is permanently connected either to the drive shaft or to the sun gear of the second planetary gear set. The transmission can thus perform functions such as boosting or recuperation in a hybrid drivetrain of a motor vehicle.

If the rotor is connected to the drive shaft, a separating clutch should preferably be arranged between the drive shaft and a drive unit external to the transmission. For this purpose, the transmission may have a connecting shaft which is connected to the drive unit external to the transmission preferably in rotationally elastic fashion via a torsional vibration damper. The connecting shaft and separating clutch may also be arranged outside the transmission. The connecting shaft is connectable to the drive shaft by the separating clutch. In this way, when the separating clutch is open, the electric machine of the transmission can drive the output shaft without at the same time having to crank the drive unit external to the transmission. Purely electric driving operation of the motor vehicle is thus made possible, specifically in all forward gear ratios of the transmission. The separating clutch may be formed as a frictionally locking or a positively locking shift element. When the separating clutch is open and the electric machine is operated counter to a primary direction of rotation of the drive shaft and a forward gear ratio is engaged, a reverse rotation of the output shaft can be realized. A separate reverse gear can thus be omitted.

If the rotor is connected to the sun gear of the second planetary gear set, no separating clutch is required between the drive shaft and the drive unit external to the transmission. This is because the rotor is separated from the drive shaft as a result of the second shift element being opened. A superposition operating mode is realized here by closing the third shift element. The other shift elements are open in this case, and the sun gear of the first planetary gear set must be rotationally fixedly immobilized. In this way, the output rotational speed can be varied in continuous fashion with a predefined rotational speed of the drive shaft and variation of the rotor rotational speed. Thus, when the transmission is used in the motor vehicle drivetrain, it is even possible to realize a launch process without keeping a shift element of the transmission as launch element in slipping operation. Cumbersome cooling of the launch element can thus be omitted.

If the rotor is connected to the sun gear of the second planetary gear set, and if the second and third shift elements are formed as frictionally locking shift elements, it is possible during electric driving operation to perform a decoupled cranked start of an internal combustion engine that is connected to the drive shaft. For this purpose, the second shift element is closed least in a slipping state in order to accelerate the internal combustion engine from a standstill to a starting rotational speed. The torque disturbances that are introduced during the starting process of the internal combustion engine can be decoupled from the output shaft by slipping operation of the third shift element, such that the cranked start is not perceptible at the output. In this way, a separate starter of the internal combustion engine can be omitted.

In one possible embodiment, the transmission has a sixth and a seventh shift element. The sun gear of the first planetary gear set can be rotationally fixedly immobilized by closing the sixth shift element. The drive shaft is connectable to the sun gear of the first planetary gear set by closing the seventh shift element, which sun gear is therefore not permanently rotationally fixedly immobilized but can switchably be rotationally fixedly immobilized. This makes it possible for at least one mechanical reverse gear ratio between the drive shaft and the output shaft to be formed.

The sixth and seventh shift elements are preferably formed as positively locking shift elements which are actuable by a common actuating mechanism. Whereas in the forward gear ratios it is always the case that the sixth shift element is closed and the seventh shift element is open, it is the case in the at least one reverse gear ratio that the seventh shift element is closed and the sixth shift element is open. A single actuator can thus be used for both shift elements. Therefore, in a first position of the actuator, the sixth shift element is closed and the seventh shift element is open. In a second position of the actuator, the seventh shift element is closed and the sixth shift element is open. A third position of the actuator may optionally be provided, in which neither the sixth nor seventh shift element is closed. This third position, which is situated between the first and second positions, permits a neutral position, and simplifies the switchover process between the first and second positions. The embodiment as positively locking shift elements improves the efficiency of the transmission. Here, a switchover process is preferably performed when the output shaft is at a standstill, or at least has only a low output rotational speed. To facilitate the switchover process in the presence of a low output rotational speed, the two shift elements may have a synchronizing device.

A first reverse gear ratio is realized by closing the first shift element, the seventh shift element and the fifth shift element. In addition or optionally in relation thereto, a second reverse gear ratio is realized by closing the first shift element, the seventh shift element and the fourth shift element. Here, the first reverse gear ratio has a short transmission ratio which is better suited to the reverse launch process.

In one possible embodiment, the first planetary gear set is formed as a stepped planetary gear set, the planet gears of which have two effective diameters of different size. Here, the sun gear of the first planetary gear set meshes with the smaller effective diameter of the planet gears, whereas the ring gear of the first planetary gear set meshes with the larger effective diameter of the planet gears. In this way, the spread of the transmission, that is to say the relationship of the transmission ratios between lowest and highest forward gear ratio, can be easily increased, without increasing the radial dimensions of the transmission. With corresponding adaptation of the fixed carrier transmission ratio of the second planetary gear set, it is possible here for the transmission ratio of the first forward gear ratio to be shortened, whereby the climbing capability of the motor vehicle in the case of a launch process on a gradient is improved.

An additional sun gear is preferably arranged on the first planetary gear set formed as a stepped planetary gear set, which additional sun gear meshes with the larger effective diameter of the planet gears. The additional sun gear is connectable to the drive shaft by an additional shift element. In this way, even if a sun gear of the first planetary gear set, which meshes with the smaller effective diameter of the planet gears, is permanently rotationally fixedly immobilized, at least one mechanical reverse gear ratio between drive shaft and output shaft can be provided, specifically by closing the additional shift element and the second, the fifth or the fourth shift element.

In a further advantageous embodiment, an additional ring gear is arranged on the first planetary gear set formed as a stepped planetary gear set, which additional ring gear meshes with the smaller effective diameter of the planet gears. The additional ring gear is connectable to the output shaft, and thus also to the carrier of the second planetary gear set, by a further additional shift element. In this way, it is possible to form two additional forward gear ratios which, in the transmission ratio series, are situated between the original second and third forward gear ratios and between the original fifth and sixth forward gear ratios. The transmission can thus be easily expanded to form an eight-ratio transmission. The new third gear ratio is formed by closing the second shift element and the further additional shift element. The new seventh gear ratio is formed by closing the third shift element and the further additional shift element. In all other gear ratios, the further additional shift element is open.

A launch element, for example a wet-running or dry-running launch clutch or a hydrodynamic torque converter, may be connected upstream of the transmission in a known manner in order, during the launch process, to permit rotational speed equalization between the drive unit external to the transmission and the drive shaft. As an alternative to this, a shift element internal to the transmission may be provided as a launch element, which must be formed as a frictionally locking shift element. It is preferable for the first shift element to be used for this purpose, because the first shift element is closed in the first forward gear ratio and possibly also in the first reverse gear ratio. As an alternative to this, the second or possibly the sixth shift element may also be used as a launch element for launching in the forward direction. In this case, the fourth or fifth shift element, or possibly the seventh shift element or the additional shift element, may be used as a launch element for launching in the reverse direction.

A permanent connection refers to a connection between two elements which exists at all times. Such permanently connected elements always rotate with the same dependency between their rotational speeds. No shift element can be situated in a permanent connection between two elements. A permanent connection is therefore distinct from a shiftable connection.

BRIEF DESCRIPTION OF THE DRAWINGS

Exemplary embodiments of the invention will be described in detail below on the basis of the appended figures.

FIG. 2 shows an engagement sequence diagram for the transmission according to the first exemplary embodiment.

FIG. 5 shows an engagement sequence diagram for the transmission according to the third exemplary embodiment.

FIG. 10 shows an engagement sequence diagram for the transmission according to the seventh exemplary embodiment.

FIG. 12 shows an engagement sequence diagram for the transmission according to the eighth exemplary embodiment.

FIG. 13 schematically shows a transmission according to a ninth exemplary embodiment of the invention.

FIG. 14 shows a detail of a transmission according to a tenth exemplary embodiment of the invention.

FIG. 15 schematically shows a transmission according to an eleventh exemplary embodiment of the invention.

FIG. 16 shows a detail of a transmission according to a twelfth exemplary embodiment of the invention.

FIG. 20 shows an engagement sequence diagram for the transmission according to the fifteenth exemplary embodiment.

FIG. 23 shows an engagement sequence diagram for the transmission according to the seventeenth exemplary embodiment.

DETAILED DESCRIPTION

Figure 1:
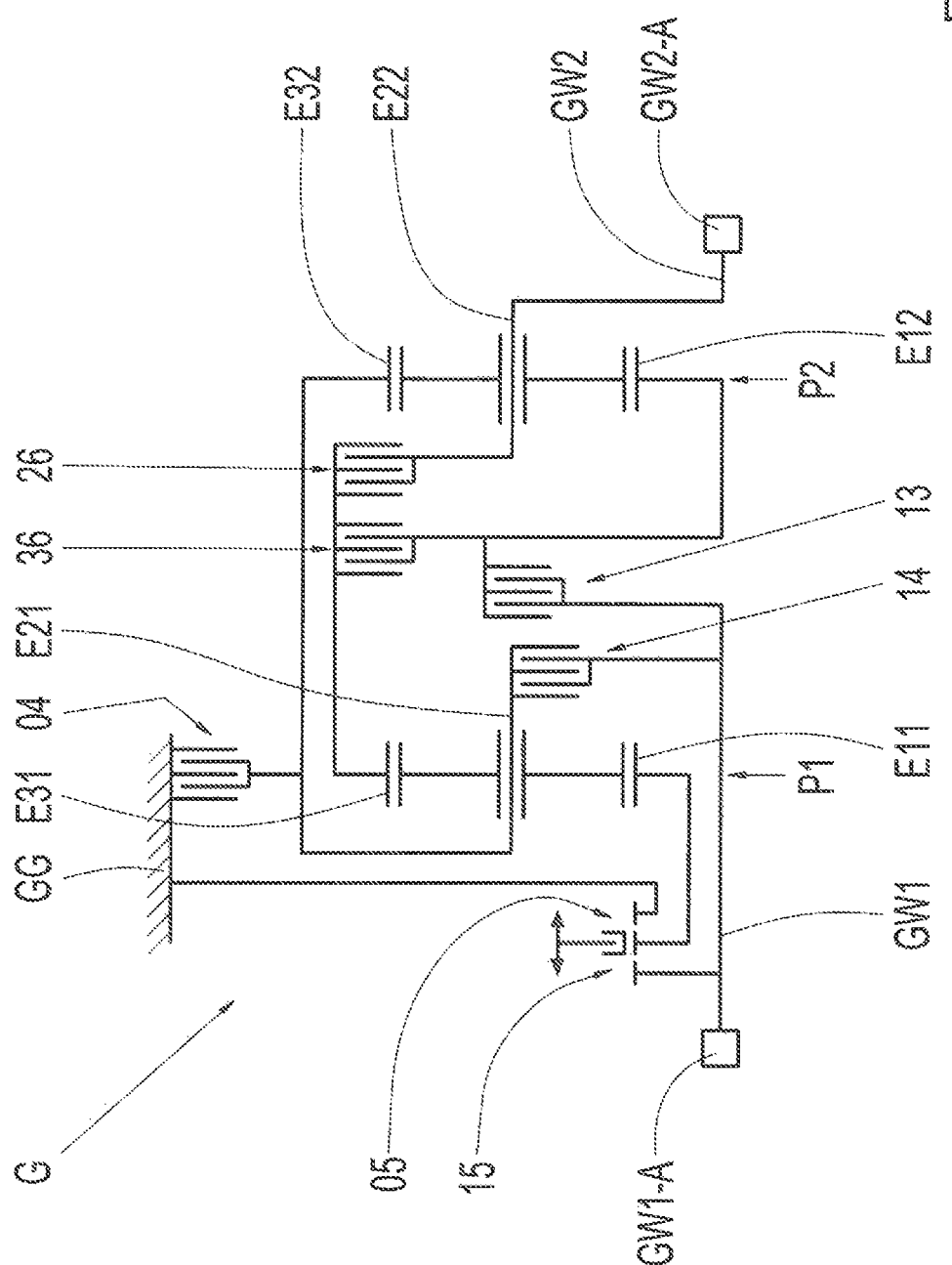
FIG. 1 schematically shows a transmission according to a first exemplary embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a transmission G according to a first exemplary embodiment of the invention. The transmission G has a first planetary gear set P1 and a second planetary gear set P2, which are both formed as negative or minus gear sets. The transmission G furthermore has a first shift element 04, a second shift element 13, a third shift element 14, a fourth shift element 26 and a fifth shift element 36. A carrier E21 of the first planetary gear set P1 is connected to a ring gear E32 of the second planetary gear set P2. An output shaft GW2 is permanently connected to a carrier E22 of the second planetary gear set P2. A drive shaft GW1 is connectable by the second shift element 13 to a sun gear E12 of the second planetary gear set P2 and by the third shift element 14 to the carrier E21 of the first planetary gear set P1. A ring gear E31 of the first planetary gear set P1 is connectable by the fourth shift element 26 to the output shaft GW2 and by the fifth shift element 36 to the sun gear E12 of the second planetary gear set P2. By closing the first shift element 04, the carrier E21 of the first planetary gear set P1 can be rotationally fixedly immobilized, in that the carrier E21 is connectable in a housing GG of the transmission G or to some other rotationally fixed structural element of the transmission G.

The transmission G as per the first exemplary embodiment furthermore has a sixth shift element 05 and a seventh shift element 15. The sixth and seventh shift elements 05, 15 are assigned to a common actuating device. If the actuating device is displaced to the left in the drawing, the seventh shift element 15 is closed, whereby the drive shaft GW1 is connected to a sun gear E11 of the first planetary gear set P1. If the actuating device is displaced to the right in the figure, the sixth shift element 05 is closed, whereby the sun gear E11 of the first planetary gear set P1 is rotationally fixedly immobilized. In a central position of the actuating device, both the sixth shift element 05 and the seventh shift element 15 are open. This neutral position facilitates the switchover process between the right-hand and left-hand shift positions.

External interfaces GW1-A, GW2-A of the drive shaft GW1 and of the output shaft GW2 are arranged coaxially with respect to one another and at opposite axial ends of the transmission G. The external interface GW1-A of the drive shaft GW1 is designed for the connection of a launch element, for example of a torque converter or of a friction clutch. Power from a drive unit external to the transmission can be supplied to the transmission G by the external interface GW1-A. The external interface GW2-A of the output shaft GW2 is designed for connection to an output of a motor vehicle.

FIG. 2 shows an engagement sequence diagram for the transmission G as per the first exemplary embodiment. Six forward gear ratios 1 to 6 and two reverse gear ratios R1, R2 are listed in the rows of the engagement sequence diagram. In the columns of the engagement sequence diagram, an X denotes which shift elements 04, 05, 13, 14, 15, 26, 36 are closed in which gear ratio. The forward gear ratios 1 to 6 and the reverse gear ratios R1, R2 refer to transmission ratios between the drive shaft GW1 and the output shaft GW2. The second reverse gear ratio R2 is provided in addition or alternatively to the first reverse gear ratio R1.

Figure 3:
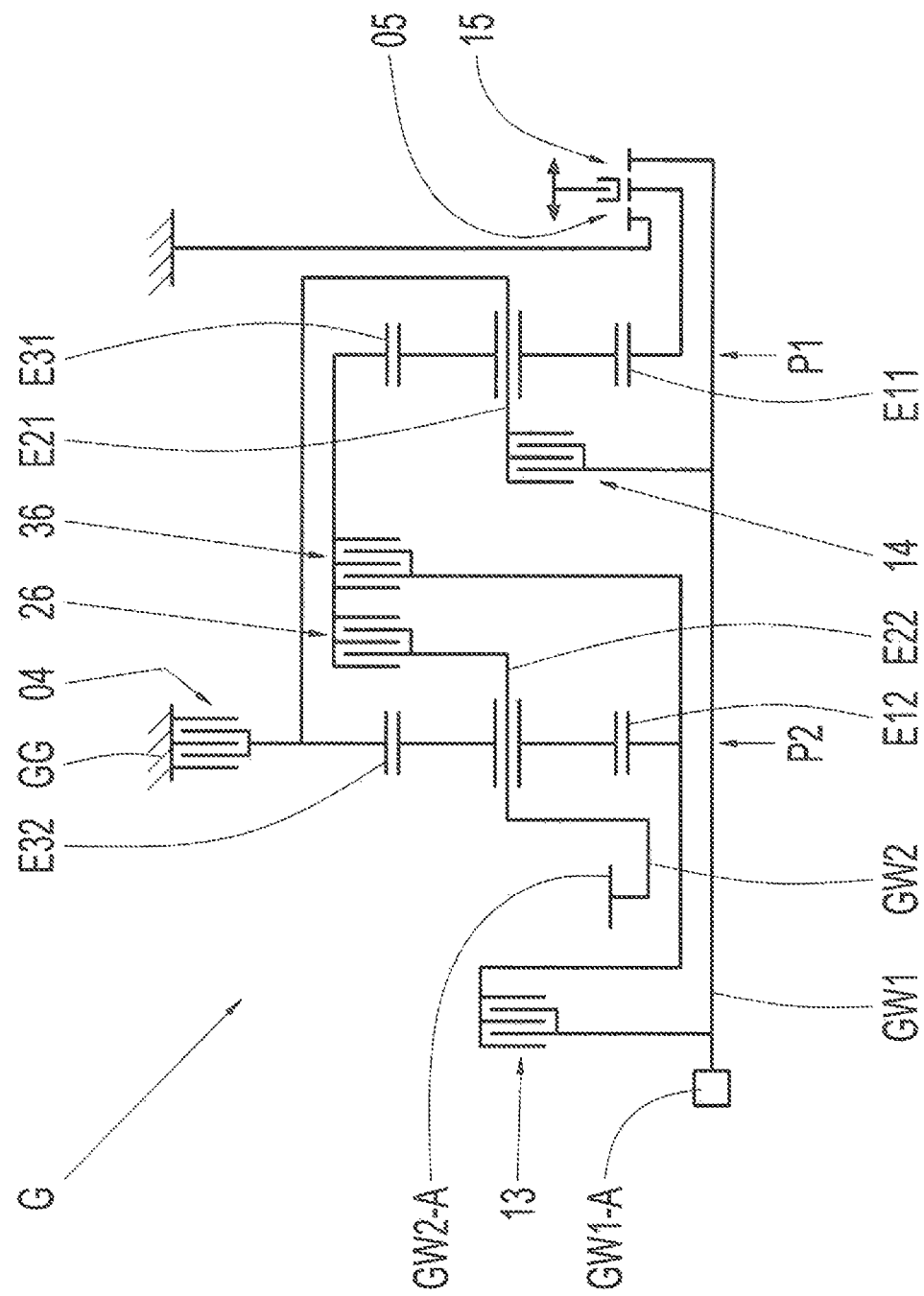
FIG. 3 schematically shows a transmission according to a second exemplary embodiment of the invention.

FIG. 3 shows a transmission G as per a second exemplary embodiment of the invention, which substantially corresponds to the first exemplary embodiment. Only the geometrical arrangement of the individual transmission components relative to one another has been changed, such that the external interfaces GW1-A, GW2-A of the drive shaft GW1 and of the output shaft GW2 are arranged coaxially with respect to one another and at the same axial end of the transmission G. The second planetary gear set P2 is in this case arranged closer than the first planetary gear set P1 to the external interfaces GW1-A, GW2-A in the axial direction. The sixth and seventh shift elements 05, 15 and the associated actuating device are now arranged at that axial end of the transmission G which is situated opposite the external interfaces GW1-A, GW2-A. The external interface GW2-A of the output shaft GW2 has a toothing which is designed to mesh with a toothing of an axially parallel shaft (not illustrated). The transmission G as per the second exemplary embodiment is thus suitable for use in a motor vehicle with a drivetrain arranged transversely with respect to the direction of travel of the motor vehicle.

Figure 4:
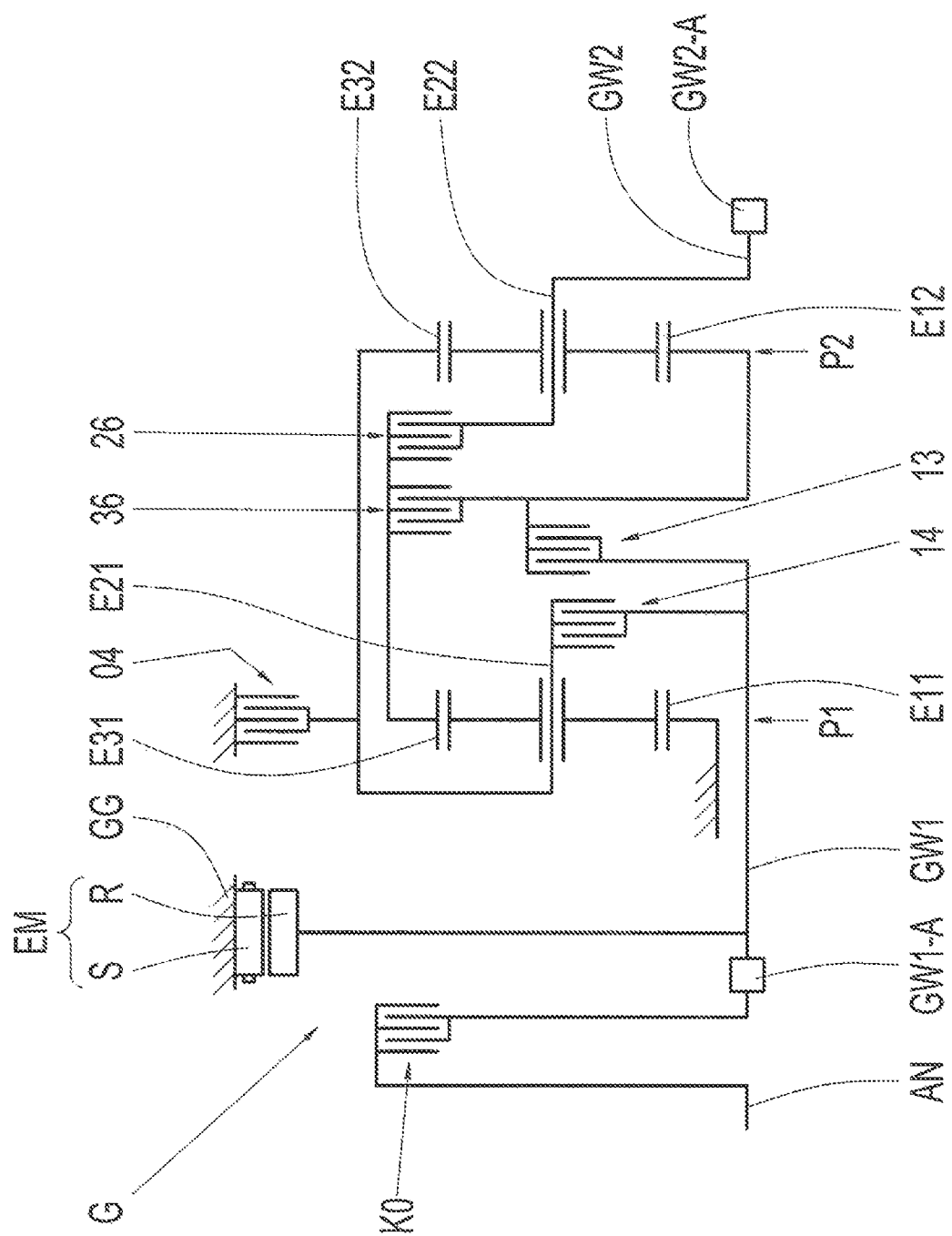
FIG. 4 schematically shows a transmission according to a third exemplary embodiment of the invention.

FIG. 4 schematically shows a transmission G according to a third exemplary embodiment of the invention, which in terms of its arrangement substantially corresponds to the first exemplary embodiment. The transmission G now has an electric motor or machine EM with a rotationally fixed stator S and with a rotatable rotor R. The rotatable rotor R is permanently connected to the drive shaft GW1. Furthermore, the transmission G now has a connecting shaft AN, which is connectable by a separating clutch K0 to the drive shaft GW1. The sixth and seventh shift elements 05, 15 are now no longer included in the transmission G. As a result, the transmission G as per the third exemplary embodiment has no mechanical reverse gear ratio between the drive shaft GW1 and the output shaft GW2. A reverse rotation of the output shaft GW2 is rather made possible by opening the separating clutch K0 and operating the electric machine EM counter to a primary direction of rotation, such that, with a forward gear ratio engaged, the output shaft GW2 rotates backward. The sun gear E11 of the first planetary gear set P1 is permanently rotationally fixedly immobilized.

Figure 5:
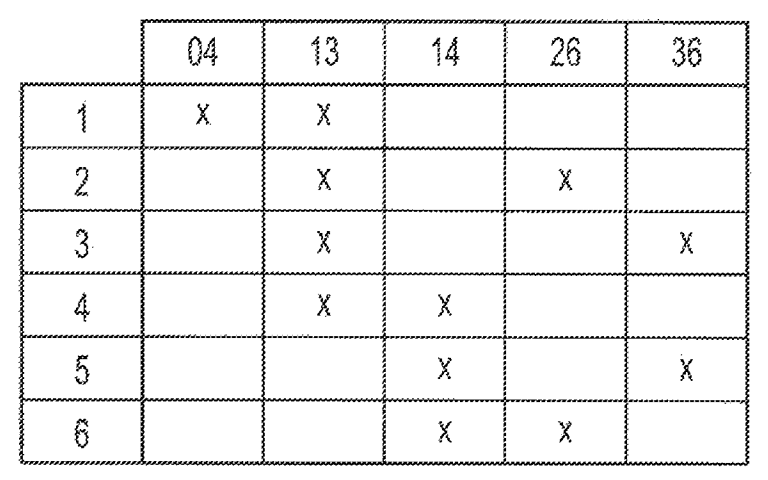

FIG. 5 shows an engagement sequence diagram for the transmission G as per the third exemplary embodiment of the invention. Owing to the permanent rotationally fixed immobilization of the sun gear E11 of the first planetary gear set P1 and the corresponding omission of the sixth and seventh shift elements 05, 15, the transmission G as per the third exemplary embodiment no longer has a mechanical reverse gear ratio R1, R2 between the drive shaft GW1 and the output shaft GW2. This does not change the formation of the forward gear ratios 1 to 6.

Figure 6:
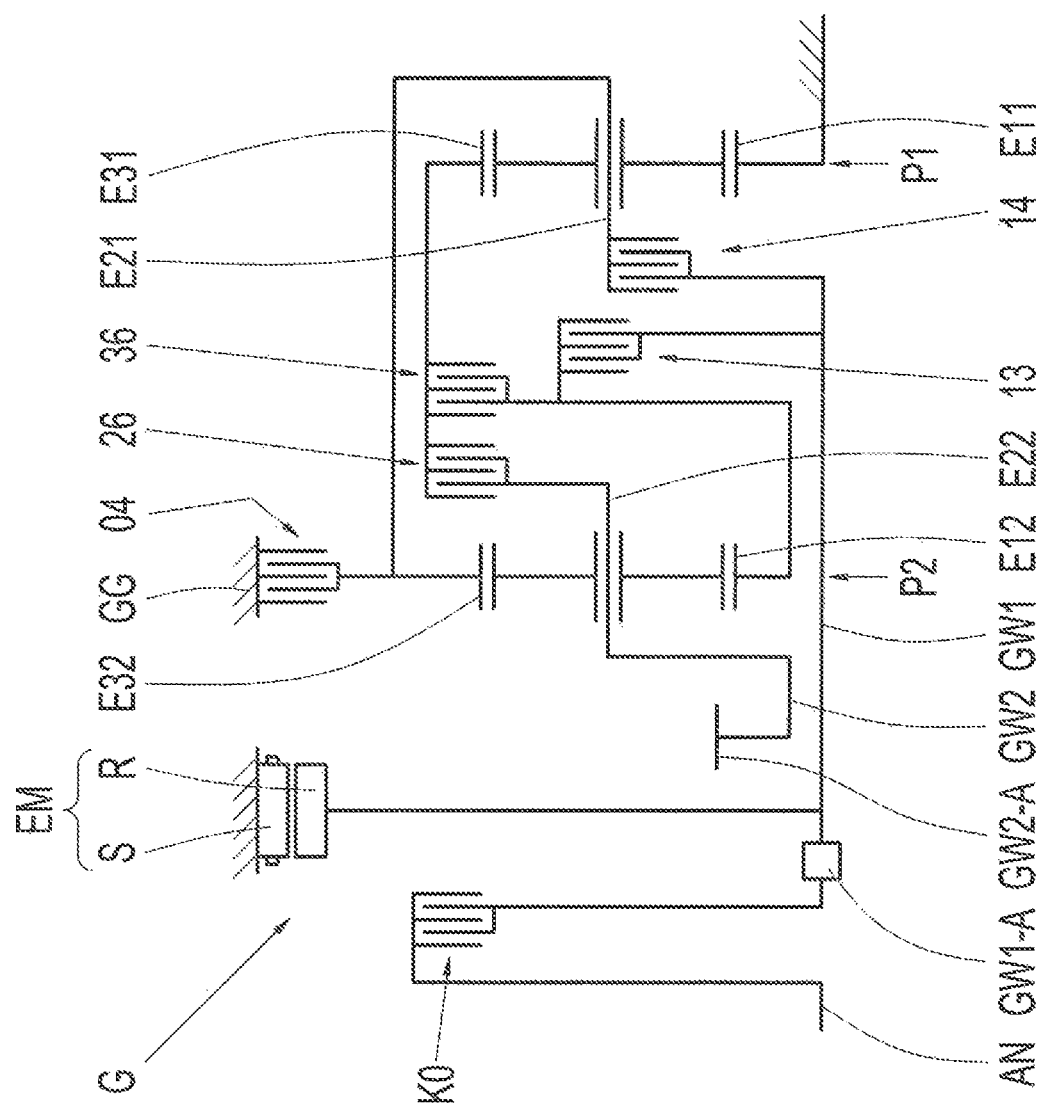
FIG. 6 schematically shows a transmission according to a fourth exemplary embodiment of the invention.

FIG. 6 schematically shows a transmission G according to a fourth exemplary embodiment of the invention, which substantially corresponds to the third exemplary embodiment. Only the geometrical arrangement of the transmission components has been changed, such that the external interfaces GW1-A, GW2-A of the drive shaft GW1 and of the output shaft GW2 are arranged in the region of the same axial end of the transmission G. The second planetary gear set P2 is arranged closer than the first planetary gear set P1 to the external interfaces GW1-A, GW2-A in the axial direction.

Figure 7:
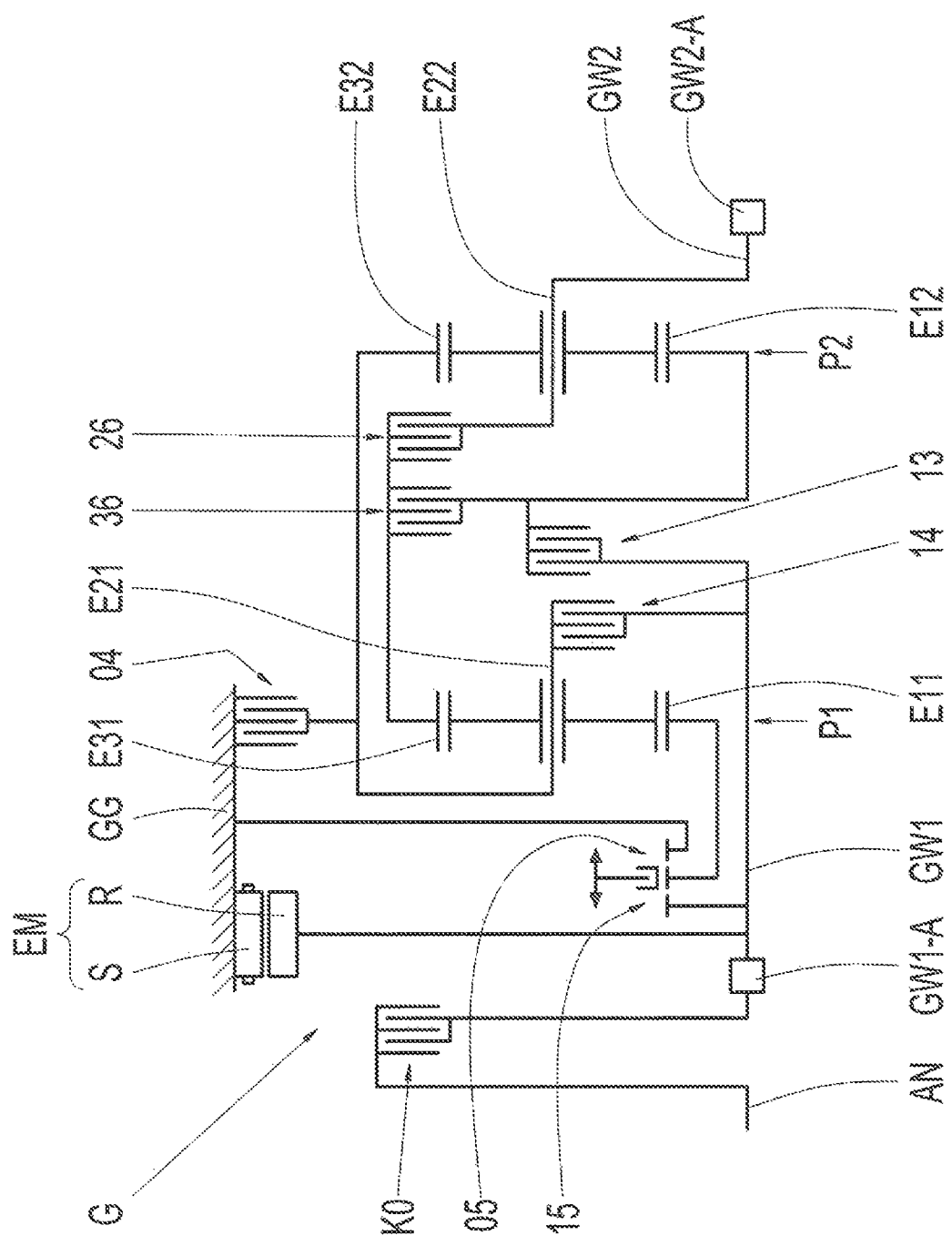
FIG. 7 schematically shows a transmission according to a fifth exemplary embodiment of the invention.

FIG. 7 schematically shows a transmission G according to a fifth exemplary embodiment of the invention. The transmission G as per the fifth exemplary embodiment substantially corresponds to the transmission G as per the third exemplary embodiment of the invention, supplemented by the sixth shift element 05 and the seventh shift element 15. These are arranged axially between the connection of the rotor R to the drive shaft GW1 and the first planetary gear set P1. As a result, the transmission G as per the fifth exemplary embodiment has at least one mechanical reverse gear ratio between the drive shaft GW1 and the output shaft GW2.

Figure 8:
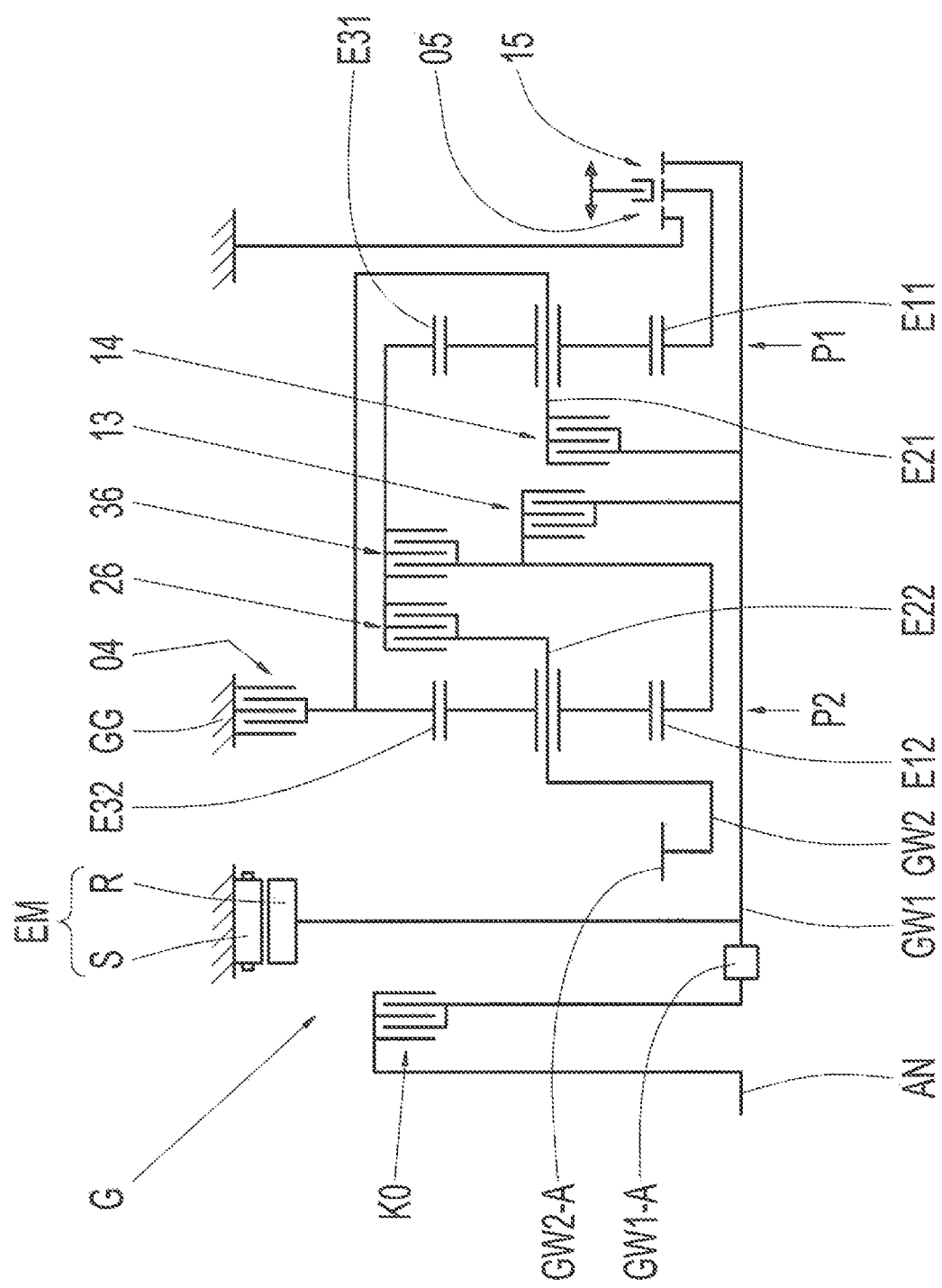
FIG. 8 schematically shows a transmission according to a sixth exemplary embodiment of the invention.

FIG. 8 schematically shows a transmission G according to a sixth exemplary embodiment of the invention, which substantially corresponds to the fourth exemplary embodiment, supplemented by the sixth shift element 05 and the seventh shift element 15.

For the second exemplary embodiment illustrated in FIG. 3, the fifth exemplary embodiment illustrated in FIG. 7 and the sixth exemplary embodiment illustrated in FIG. 8, the engagement sequence diagram as per FIG. 2 is applicable. For the third exemplary embodiment illustrated in FIG. 4 and the fourth exemplary embodiment illustrated in FIG. 6, the engagement sequence diagram as per FIG. 5 is applicable.

Figure 9:
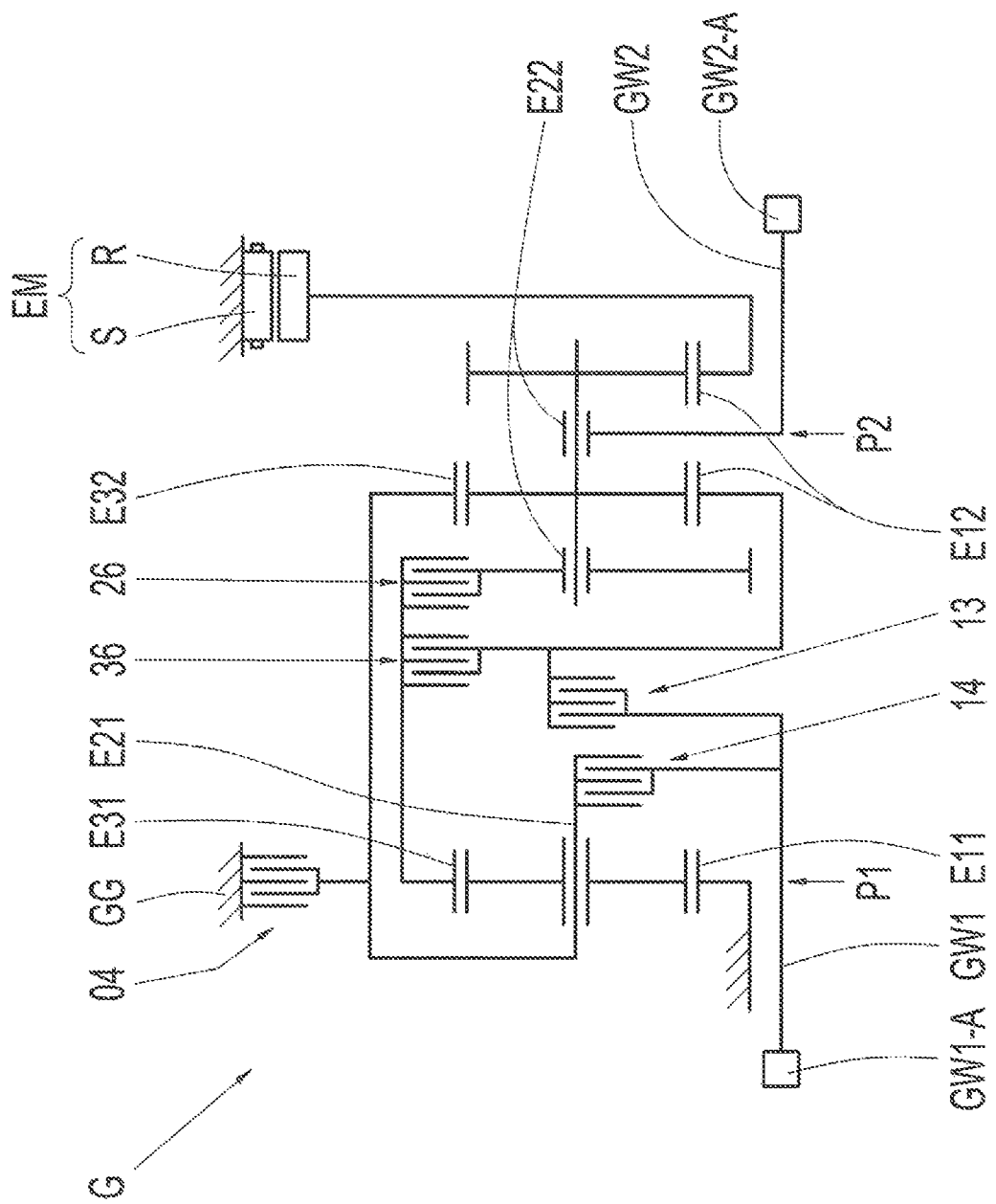
FIG. 9 schematically shows a transmission according to a seventh exemplary embodiment of the invention.

FIG. 9 schematically shows a transmission G according to a seventh exemplary embodiment of the invention. The rotor R of the electric machine EM is now connected no longer to the drive shaft GW1 but to the sun gear E12 of the second planetary gear set P2. To nevertheless permit a coaxial arrangement of the external interfaces GW1-A, GW2-A of the drive shaft GW1 and of the output shaft GW2 at opposite axial ends of the transmission G, the sun gear E12 of the second planetary gear set P2 is divided into two individual sun gear segments. A connection of the output shaft GW2 to the carrier E22 of the second planetary gear set P2 is possible between these two sun gear segments. The two sun gear segments have the same effective diameter. Therefore, the rotational speeds at both sun gear segments are identical. The arrangement of the rotor R on the sun gear E12 of the second planetary gear set P2 permits a superposition operating mode EDA in which, by closing the third shift element 14, the drive shaft GW1 is connected to the ring gear E32 of the second planetary gear set P2, the electric machine EM is connected to the sun gear E12 of the second planetary gear set P2, and the carrier E22 of the second planetary gear set P2 is connected to the output shaft GW2. Thus, the electric machine EM, a drive unit which is external to the transmission and which is connected to the drive shaft GW1, and the output GW2 are connected to in each case one element of the second planetary gear set P2. Here, if the electric machine EM imparts no torque or outputs no torque, no power can be transmitted from the drive shaft GW1 to the output shaft GW2. Only as a result of a supporting torque being imparted by the electric machine EM is a transmission of power via the second planetary gear set P2 possible in the superposition operating mode EDA. A launch process can thus be realized through variation of the rotational speed of the rotor R in the presence of a given rotational speed of the drive shaft GW1.

FIG. 10 shows an engagement sequence diagram for the transmission G as per the seventh exemplary embodiment. In FIG. 10, not only the six forward gear ratios 1 to 6 and the superposition operating mode EDA but also three electric gear ratios E1, E2, E3 are listed in the rows of the engagement sequence diagram, which electric gear ratios E1, E2, E3 represent three different transmission ratios between the rotor R and the output shaft GW2. In said electric gear ratios E1, E2, E3, no power is transmitted from the rotor R to the drive shaft GW1. A separating clutch K0 between the external interface GW1-A of the drive shaft GW1 and a drive source external to the transmission can thus be omitted.

Figure 11:
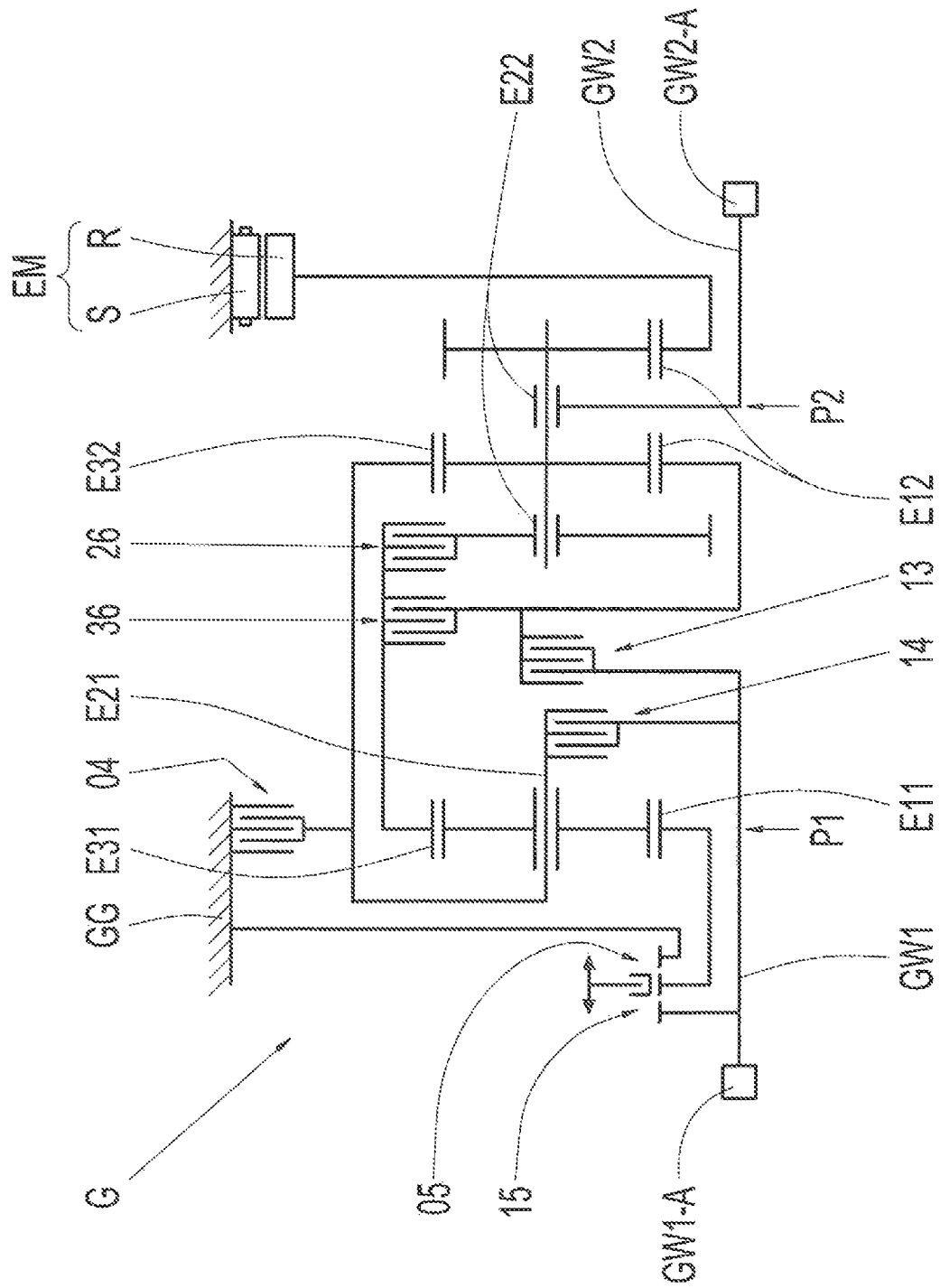
FIG. 11 schematically shows a transmission according to an eighth exemplary embodiment of the invention.

FIG. 11 schematically shows a transmission G according to an eighth exemplary embodiment of the invention, which substantially corresponds to the seventh exemplary embodiment illustrated in FIG. 9, supplemented by the sixth and seventh shift elements 05, 15. The transmission as per the eighth exemplary embodiment thus has at least one mechanical reverse gear ratio R1, R2 between the drive shaft GW1 and the output shaft GW2, as emerges from the engagement sequence diagram illustrated in FIG. 12.

FIG. 13 schematically shows a transmission G according to a ninth exemplary embodiment of the invention, which substantially corresponds to the seventh exemplary embodiment illustrated in FIG. 9. Only the relative arrangement of the transmission components with respect to one another has been changed, such that the external interfaces GW1-A, GW2-A are now arranged in the region of the same axial end of the transmission G. The rotor R of the electric machine EM is furthermore connected to the sun gear E12 of the second planetary gear set P2. In this arrangement, a division of the sun gear E12 of the second planetary gear set P2 is no longer necessary. The sun gear E11 of the first planetary gear set P1 is permanently rotationally fixedly immobilized.

FIG. 14 shows a detail of a transmission G according to a tenth exemplary embodiment of the invention, which substantially corresponds to the ninth exemplary embodiment illustrated in FIG. 13. The transmission G according to the tenth exemplary embodiment has merely been supplemented by the sixth and seventh shift elements 05, 15. As a result, the transmission G as per the tenth exemplary embodiment is provided with at least one mechanical reverse gear ratio R1, R2 between the drive shaft GW1 and the output shaft GW2. For the transmission G according to the tenth exemplary embodiment, the engagement sequence diagram as per FIG. 12 is applicable, and for the transmission G as per the ninth exemplary embodiment, the engagement sequence diagram as per FIG. 10 is applicable.

FIG. 15 schematically shows a transmission G according to an eleventh exemplary embodiment of the invention. In this, the first planetary gear set P1 is formed as a stepped planetary gear set, the planet gears PL1 of which have two effective diameters of different size. The sun gear E11 of the first planetary gear set P1 meshes with the smaller effective diameter of the planet gears PL1 and is permanently rotationally fixedly immobilized. The ring gear E31 of the first planetary gear set P1 meshes with the larger effective diameter of the planet gears PL1. Owing to the embodiment as a stepped planetary gear set, the fixed carrier transmission ratio of the first planetary gear set P1 can be greatly increased, without increasing the radial structural space requirement of the first planetary gear set P1.

FIG. 16 shows a detail of a transmission G according to a twelfth exemplary embodiment of the invention, which substantially corresponds to the eleventh exemplary embodiment illustrated in FIG. 15. In this, the sun gear E11 of the first planetary gear set P1 is now no longer permanently rotationally fixedly immobilized, but rather can be rotationally fixedly immobilized by the sixth shift element 05. The drive shaft GW1 is connectable to the sun gear E11 of the first planetary gear set P1 by closing the seventh shift element 15.

In the transmissions G as per the eleventh and twelfth exemplary embodiments, the rotor R of the electric machine EM is permanently connected to the drive shaft GW1. This is to be regarded merely as an example. The transmission G could also be implemented without the electric machine EM and still have a first planetary gear set P1 formed as a stepped planetary gear set. A connection of the electric machine EM to the sun gear E12 of the second planetary gear set P2 is also possible. For the eleventh exemplary embodiment illustrated in FIG. 15, the engagement sequence diagram as per FIG. 5 is applicable. For the twelfth exemplary embodiment illustrated in FIG. 16, the engagement sequence diagram as per FIG. 2 is applicable.

Figure 17:
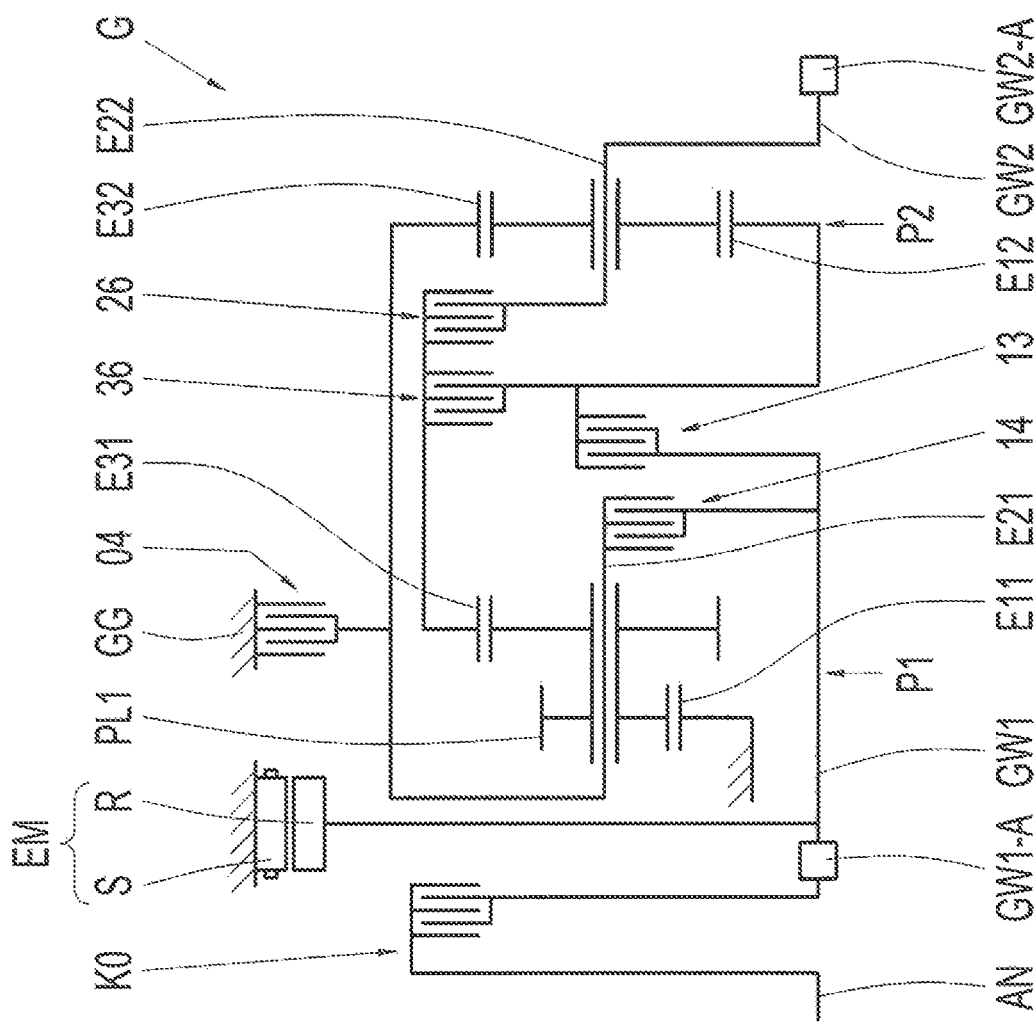
FIG. 17 schematically shows a transmission according to a thirteenth exemplary embodiment of the invention.

FIG. 17 schematically shows a transmission G according to a thirteenth exemplary embodiment of the invention, which substantially corresponds to the eleventh exemplary embodiment illustrated in FIG. 15. Only the relative arrangement of the transmission components with respect to one another has been changed, such that the external interfaces GW1-A, GW2-A of the drive shaft GW1 and of the output shaft GW2 are now arranged at opposite axial ends of the transmission G. For the thirteenth exemplary embodiment illustrated in FIG. 17, the engagement sequence diagram as per FIG. 5 is applicable. The transmission G as per the thirteenth exemplary embodiment could also be implemented without the electric machine EM and still have a first planetary gear set P1 formed as a stepped planetary gear set. A connection of the electric machine EM to the sun gear E12 of the second planetary gear set P2 is also possible.

Figure 18:
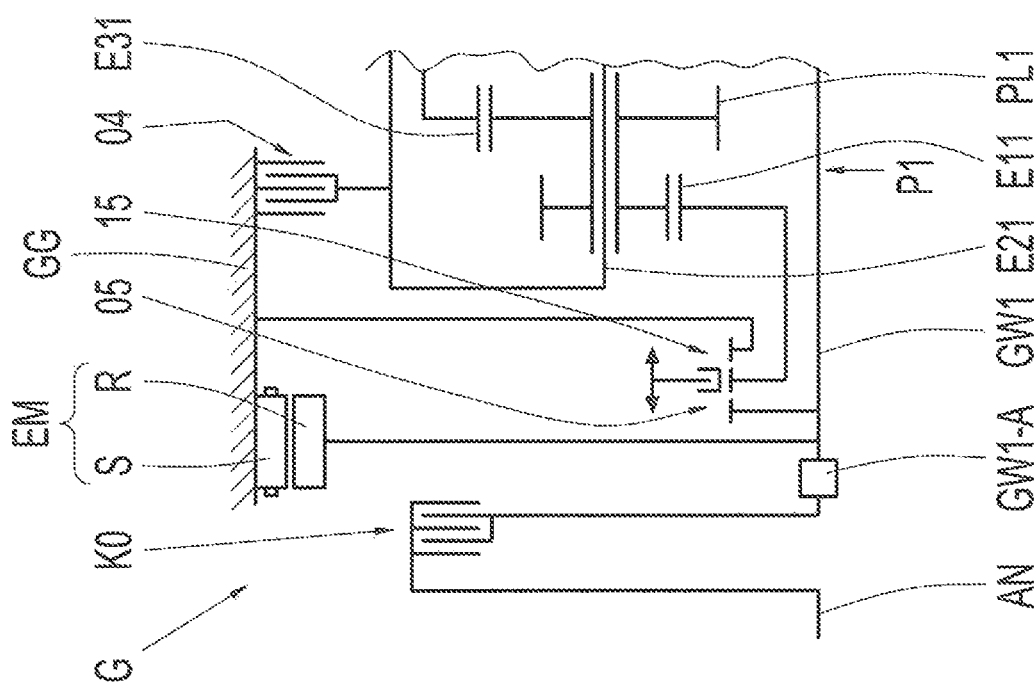
FIG. 18 shows a detail of a transmission according to a fourteenth exemplary embodiment of the invention.

FIG. 18 shows a detail of a transmission G according to a fourteenth exemplary embodiment of the invention, which substantially corresponds to the thirteenth exemplary embodiment illustrated in FIG. 17. The transmission G now has the sixth shift element 05 and the seventh shift element 15 which, together with the associated actuating device, are arranged between the connection of the rotor R to the drive shaft GW1 and the first planetary gear set P1, which is formed as a stepped planetary gear set. For the fourteenth exemplary embodiment illustrated in FIG. 18, the engagement sequence diagram as per FIG. 2 is applicable.

Figure 19:
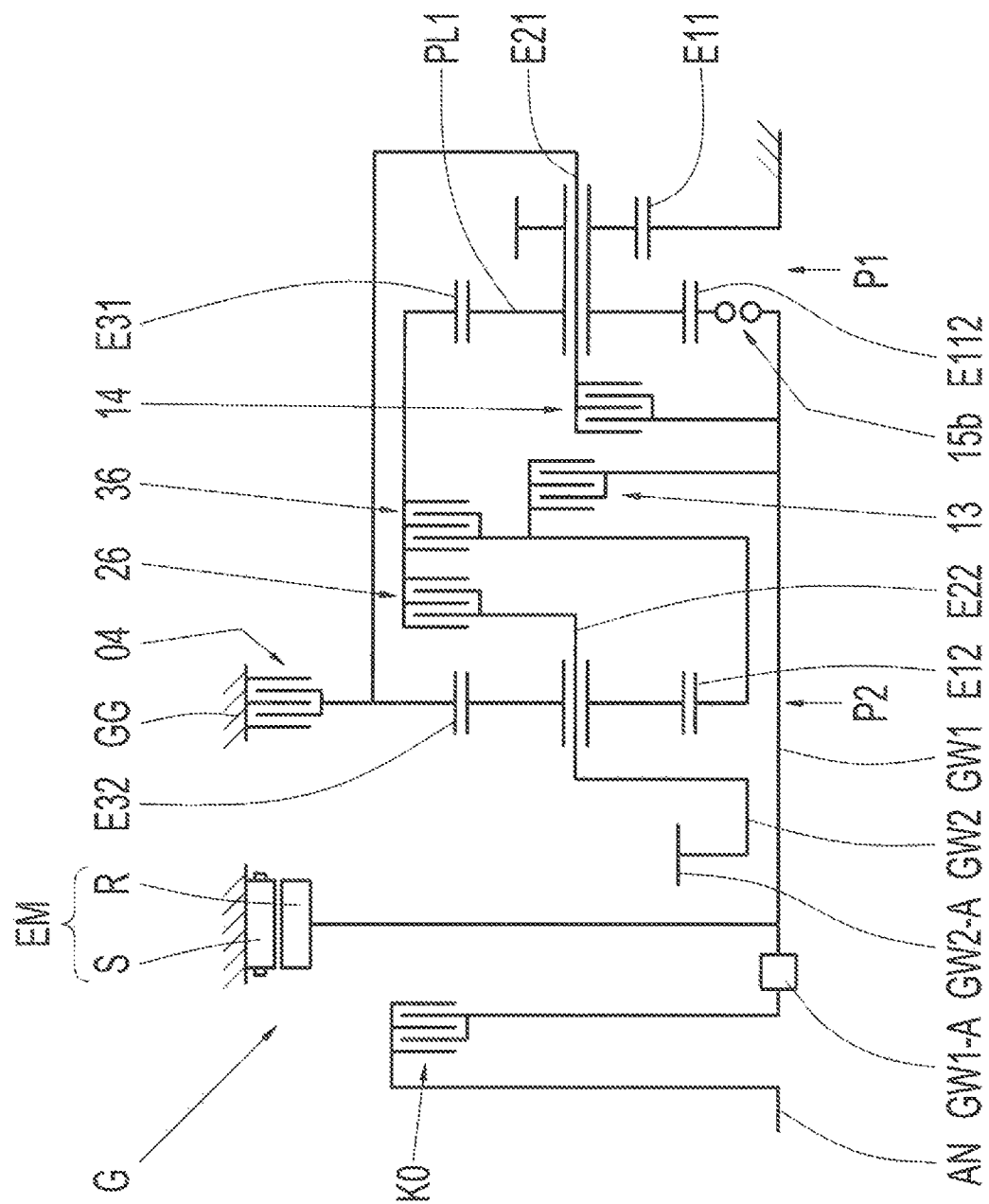
FIG. 19 schematically shows a transmission according to a fifteenth exemplary embodiment of the invention.

FIG. 19 schematically shows a transmission G according to a fifteenth exemplary embodiment of the invention, which substantially corresponds to the eleventh exemplary embodiment illustrated in FIG. 15. In this, the first planetary gear set P1, which is formed as a stepped planetary gear set, has an additional sun gear E112, which is connectable by an additional shift element 15*b* to the drive shaft GW1. The additional sun gear E112 meshes with the larger diameter of the planet gears PL1. The sun gear E11 of the first planetary gear set P1, which meshes with the smaller effective diameter of the planet gears PL1, is permanently rotationally fixedly immobilized. The transmission G as per the fifteenth exemplary embodiment could also be implemented without the electric machine EM and still have a first planetary gear set P1 formed as a stepped planetary gear set. A connection of the electric machine EM to the sun gear E12 of the second planetary gear set P2 is also possible.

The engagement sequence diagram illustrated in FIG. 20 shows that the additional shift element 15*b* permits the formation of three reverse gear ratios R1*b*, R2*b*, R3*b* between the drive shaft GW1 and the output shaft GW2.

Figure 21:
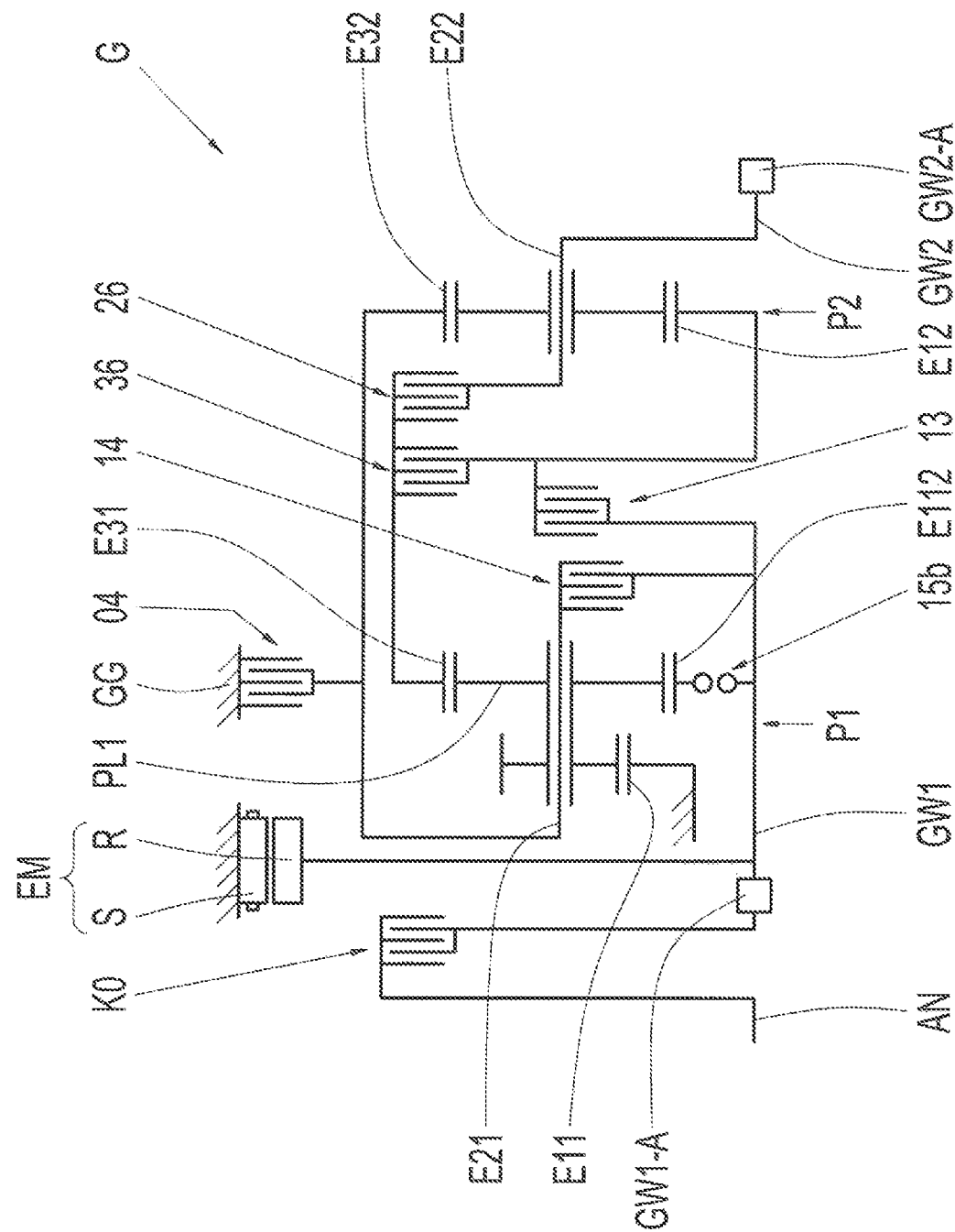
FIG. 21 schematically shows a transmission according to a sixteenth exemplary embodiment of the invention.

FIG. 21 schematically shows a transmission G according to a sixteenth exemplary embodiment of the invention, which substantially corresponds to the fifteenth exemplary embodiment illustrated in FIG. 19. Only the relative arrangement of the transmission components with respect to one another has been changed, such that the external interfaces GW1-A, GW2-A of the drive shaft GW1 and of the output shaft GW2 are now arranged at opposite axial ends of the transmission G. For the transmission G as per the sixteenth exemplary embodiment, the engagement sequence diagram as per FIG. 20 is applicable.

Figure 22:
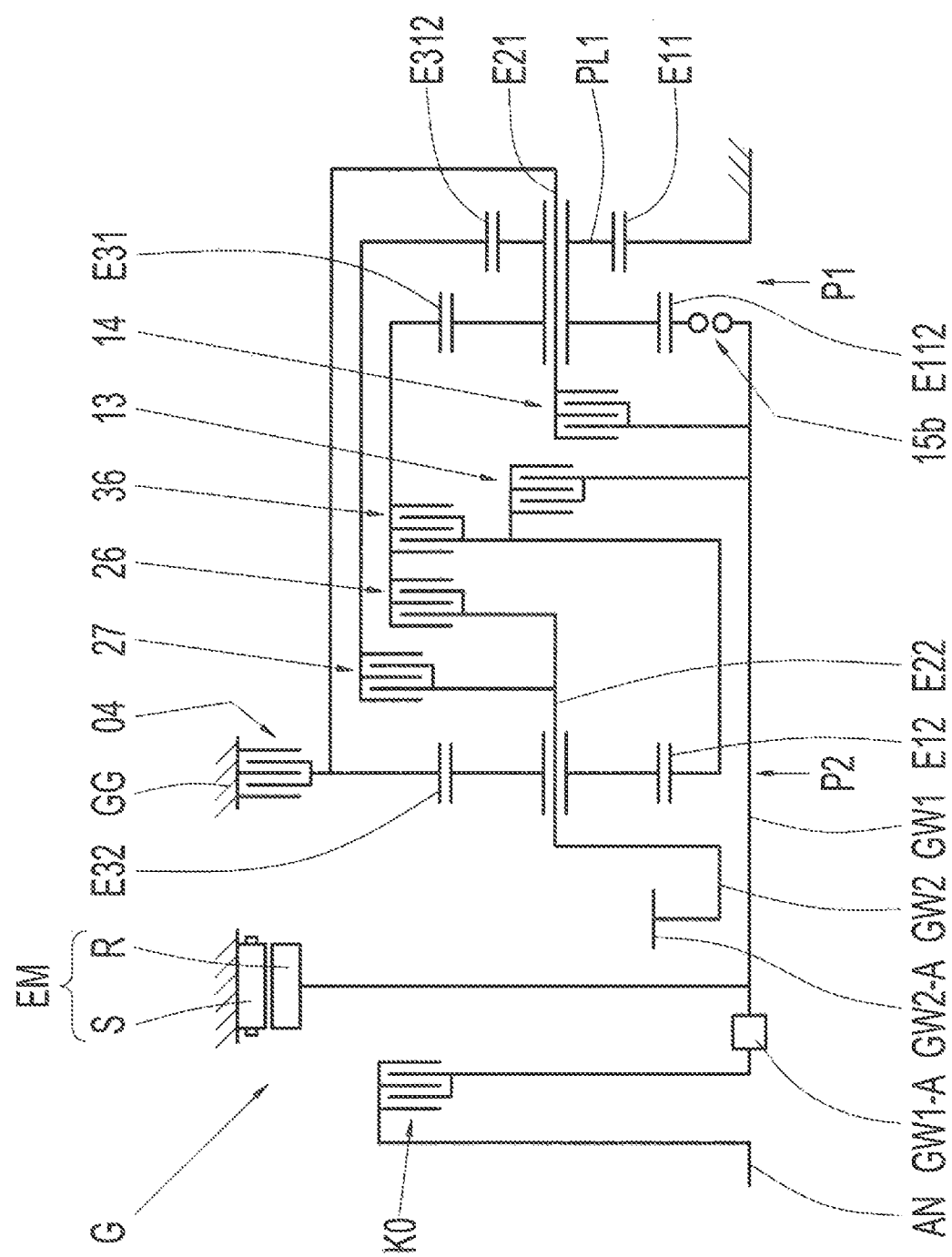
FIG. 22 schematically shows a transmission according to a seventeenth exemplary embodiment of the invention.

FIG. 22 schematically shows a transmission G according to a seventeenth exemplary embodiment of the invention, which substantially corresponds to the fifteenth exemplary embodiment illustrated in FIG. 19. The first planetary gear set P1, which is formed as a stepped planetary gear set, has had added to it an additional ring gear E312, which meshes with the smaller effective diameter of the planet gears PL1. The additional ring gear E312 of the first planetary gear set P1 is connectable by a further additional shift element 27 to the output shaft GW2. As a result, the transmission G as per the seventeenth exemplary embodiment is provided with two additional forward gear ratios which, in the transmission ratio series of the original six forward gear ratios, are arranged between the original second and third forward gear ratios 2, 3 and between the original fifth and sixth forward gear ratios 5, 6. The transmission G as per the seventeenth exemplary embodiment could also be implemented without the electric machine EM and still have a first planetary gear set P1 formed as a stepped planetary gear set. A connection of the electric machine EM to the sun gear E12 of the second planetary gear set P2 is also possible.

As can be seen from the engagement sequence diagram illustrated in FIG. 23, the further additional shift element 27 is closed in the new forward gear ratios 3*b* and 7*b*. The further additional shift element 27 is open in the other forward gear ratios 1*b*, 2*b*, 4*b*, 5*b*, 6*b*, 8*b*. The further additional shift element 27 is likewise open in the reverse gear ratios R1*b*, R2*b*, R3*b*. The transmission G could also be formed the additional shift element 15*b* and the additional sun gear E112 of the first planetary gear set P1. For the formation of at least one reverse gear ratio R1, R2 between the drive shaft GW1 and the output shaft GW2, the permanent rotationally fixed immobilization of the sun gear E11 of the first planetary gear set P1 would have to be eliminated and converted into switchable rotationally fixed immobilization in the form of the sixth shift element 05, wherein the drive shaft GW1 would have to be connected to the sun gear E11 by the seventh shift element 15.

Figure 24:
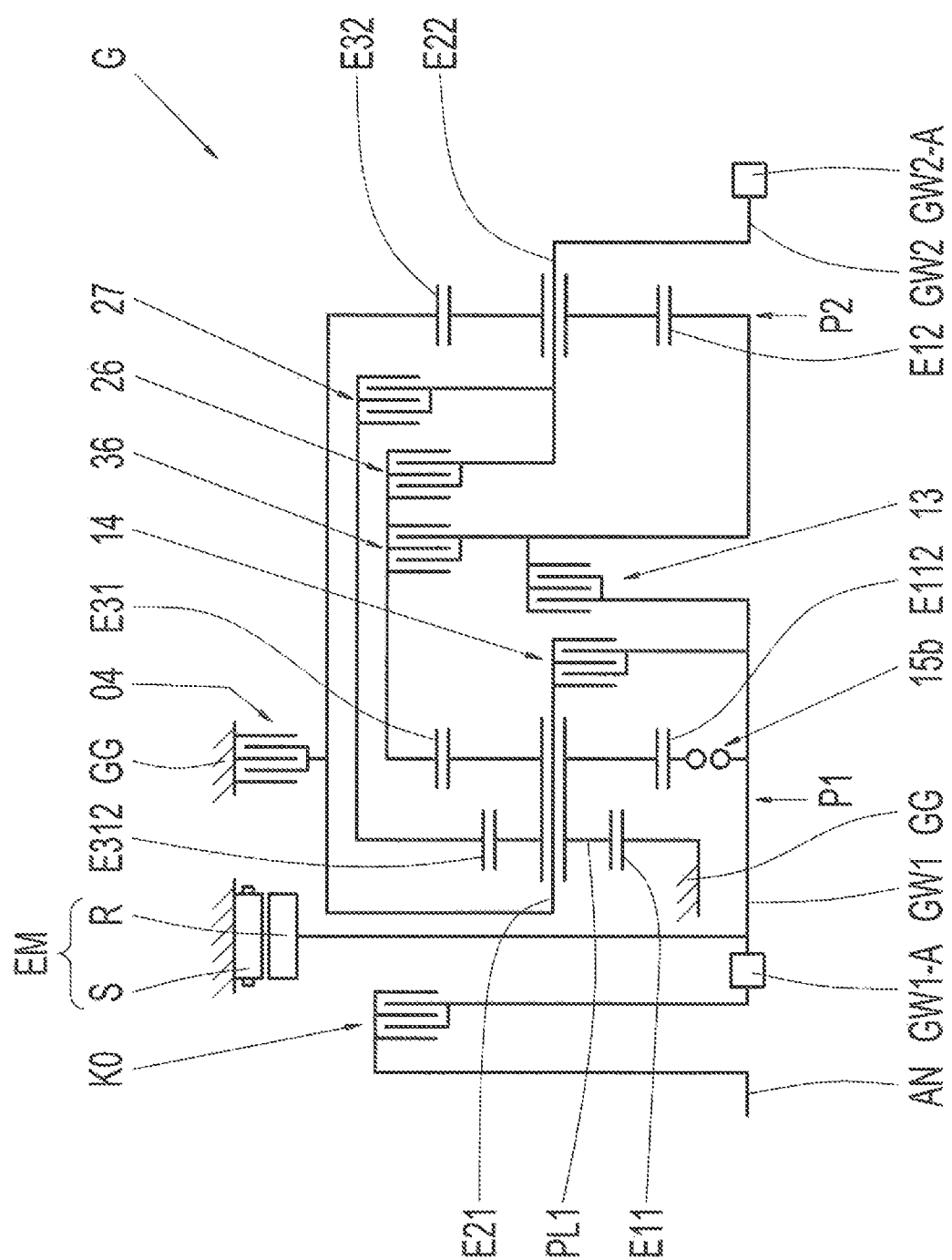
FIG. 24 schematically shows a transmission according to an eighteenth exemplary embodiment of the invention.

FIG. 24 schematically shows a transmission G according to an eighteenth exemplary embodiment of the invention, which substantially corresponds to the seventeenth exemplary embodiment illustrated in FIG. 22. Only the relative arrangement of the components with respect to one another has been changed, such that the external interfaces GW1-A, GW2-A of the drive shaft GW1 and of the output shaft GW2 are now arranged at opposite axial ends of the transmission G. For the transmission G as per the eighteenth exemplary embodiment, the engagement sequence diagram as per FIG. 23 is applicable. The transmission G as per the seventeenth exemplary embodiment could also be implemented without the electric machine EM and still have a first planetary gear set P1 formed as a stepped planetary gear set. A connection of the electric machine EM to the sun gear E12 of the second planetary gear set P2 is also possible.

Figure 25:
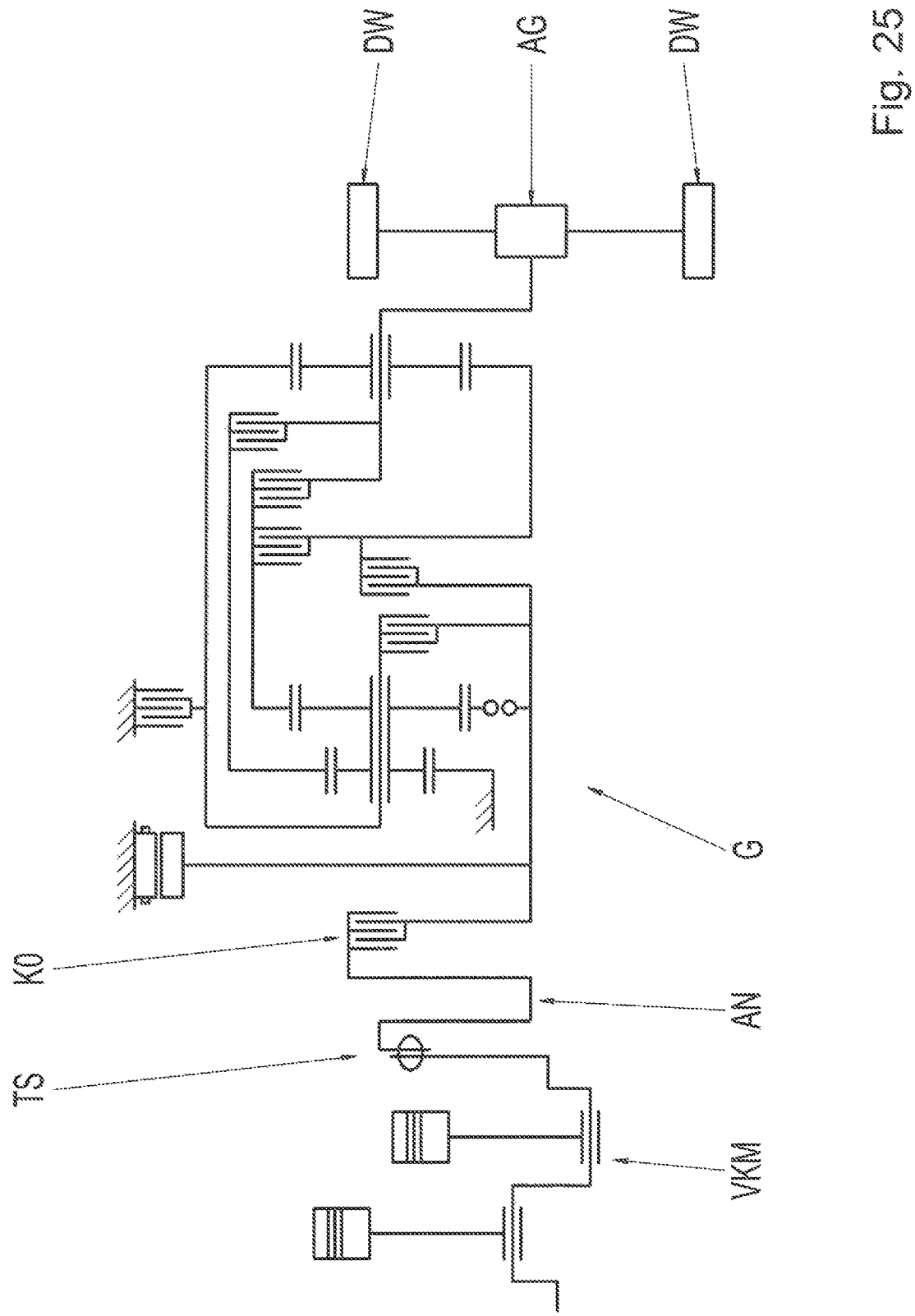
FIG. 25 shows a drivetrain of a motor vehicle.

FIG. 25 shows a drivetrain of a motor vehicle having a transmission G as per the eighteenth exemplary embodiment of the invention. This is to be regarded merely as an example. The drivetrain could be implemented with any of the specified exemplary embodiments of the transmission G. The drivetrain has an internal combustion engine VKM, which is connected to the connecting shaft AN of the transmission G via a torsional vibration damper TS. If the transmission G has no electric machine EM, the torsional vibration damper TS would be connected either directly to the drive shaft GW1 or via a launch element to the drive shaft GW1. In exemplary embodiments of the transmission G in which the rotor R of the electric machine EM is connected to the sun gear E12 of the second planetary gear set P2, the torsional vibration damper TS would preferably be connected directly to the drive shaft GW1 of the transmission G. The output shaft GW2 of the transmission G is operatively connected in terms of drive to an axle transmission AG. From the axle transmission AG, the power acting at the output shaft GW2 is distributed to wheels DW of the motor vehicle. If the separating clutch K0 is closed, the motor vehicle can be driven by operation of the internal combustion engine VKM. The electric machine EM may for this purpose likewise output or receive power. If the separating clutch K0 is open, purely electric driving operation of the motor vehicle is possible.

Modifications and variations can be made to the embodiments illustrated or described herein without departing from the scope and spirit of the invention as set forth in the appended claims.

REFERENCE DESIGNATIONS

G Transmission
GG Housing
GW1 Drive shaft
GW2 Output shaft
GW1-A External interface of the drive shaft
GW2-A External interface of the output shaft
P1 First planetary gear set
E11 Sun gear of the first planetary gear set
E21 Carrier of the first planetary gear set
E31 Ring gear of the first planetary gear set
E112 Additional sun gear of the first planetary gear set
E312 Additional ring gear of the first planetary gear set
PL1 Planet gears of the first planetary gear set
P2 Second planetary gear set
E12 Sun gear of the second planetary gear set
E22 Carrier of the second planetary gear set
E32 Ring gear of the second planetary gear set
04 First shift element
13 Second shift element
14 third shift element
26 Fourth shift element
36 Fifth shift element
05 Sixth shift element
15 Seventh shift element
15b Additional shift element
27 Additional shift element
EM Electric machine
R Rotor of the electric machine
S Stator of the electric machine
AN Connecting shaft
K0 Separating clutch
1-6 First to sixth forward gear ratio
1b-8b First to eighth forward gear ratio
E1-E3 First to third electric gear ratio
R1 First reverse gear ratio
R2 Second reverse gear ratio
R1b-R3b Reverse gear ratios
EDA Superposition operating mode
VKM Internal combustion engine
DW Wheels
AG Axle transmission
TS Torsional vibration damper

The invention claimed is:
1. A transmission (G) for a motor vehicle, comprising:
a drive shaft (GW1);
an output shaft (GW2);
a first planetary gear set (P1) and a second planetary gear set (P2); and
a first shift element (04), a second shift element (13), a third shift element (14), a fourth shift element (26) and a fifth shift element (36),
wherein a carrier (E21) of the first planetary gear set (P1) is permanently connected to a ring gear (E32) of the second planetary gear set (P2),
wherein the output shaft (GW2) is permanently connected to a carrier (E22) of the second planetary gear set (P2),
wherein the carrier (E21) of the first planetary gear set (P1) is rotationally fixable by closing the first shift element (04),
wherein the drive shaft (GW1) is connectable to a sun gear (E12) of the second planetary gear set (P2) by closing the second shift element (13),
wherein the drive shaft (GW1) is connectable to the carrier (E21) of the first planetary gear set (P1) by closing the third shift element (14),
wherein a ring gear (E31) of the first planetary gear set (P1) is connectable to the output shaft (GW2) by closing the fourth shift element (26),
wherein the ring gear (E31) of the first planetary gear set (P1) is connectable to the sun gear (E12) of the second planetary gear set (P2) by closing the fifth shift element (36), and
wherein a sun gear (E11) of the first planetary gear set (P1) is either permanently rotationally fixed or switchably rotationally fixable.

2. The transmission (G) of claim 1, wherein six forward gear ratios (1-6) between the drive shaft (GW1) and the output shaft (GW2) are engagable through selective pairwise closure of the first, second, third, fourth and fifth shift elements (04, 13, 14, 26, 36) and rotationally fixed immobilization of the sun gear (E11) of the first planetary gear set (P1), wherein
the first forward gear ratio (1) is realized by closing the first shift element (04) and the second shift element (13),
the second forward gear ratio (2) is realized by closing the second shift element (13) and the fourth shift element (26),
the third forward gear ratio (3) is realized by closing the second shift element (13) and the fifth shift element (36),
the fourth forward gear ratio (4) is realized by closing the second shift element (13) and the third shift element (14),
the fifth forward gear ratio (5) is realized by closing the third shift element (14) and the fifth shift element (36), and
the sixth forward gear ratio (6) is realized by closing the third shift element (14) and the fourth shift element (26).

3. The transmission (G) of claim 1, wherein the first shift element (04), the second shift element (13), or both the first and second shift elements (04, 13) is formed as a positively locking shift element.

4. The transmission (G) of claim 1, wherein an external interface (GW1-A) of the drive shaft (GW1) is arranged coaxially with an external interface (GW2-A) of the output shaft (GW2), the external interfaces (GW1-A, GW2-A) of the drive shaft (GW1) and the output shaft (GW2) are arranged at opposite axial ends of the transmission (G), and the second planetary gear set (P2) is positioned axially further from the external interface (GW1-A) of the drive shaft (GW1) than the first planetary gear set (P1).

5. The transmission (G) of claim 1, wherein an external interface (GW1-A) of the drive shaft (GW1) is arranged coaxially with an external interface (GW2-A) of the output shaft (GW2), the external interfaces (GW1-A, GW2-A) of the drive shaft (GW1) and the output shaft (GW2) are arranged at a common axial end of the transmission (G), and the second planetary gear set (P2) is positioned axially closer to the external interface (GW1-A) of the drive shaft (GW1) than the first planetary gear set (P1).

6. The transmission (G) of claim 1, further comprising an electric motor (EM) with a rotationally fixed stator (S) and a rotatable rotor (R), wherein the rotor (R) is permanently connected either to the drive shaft (GW1) or to the sun gear (E12) of the second planetary gear set (P2).

7. The transmission (G) of claim 6, wherein the rotor (R) is permanently connected to the sun gear (E12) of the second planetary gear set (P2), and a superposition operating mode (EDA) is realized by closing the third shift element (14) and by rotationally fixing the sun gear (E11) of the first planetary gear set (P1).

8. The transmission (G) of claim 1, further comprising a sixth shift element (05) and a seventh shift element (15), wherein the sun gear (E11) of the first planetary gear set (P1) is rotationally fixable by closing the sixth shift element (05), and the drive shaft (GW1) is connectable to the sun gear (E11) of the first planetary gear set (P1) by closing the seventh shift element (15).

9. The transmission (G) of claim 8, wherein the sixth and seventh shift elements (05, 15) are positively locking shift elements that are actuatable by a common actuating mechanism.

10. The transmission (G) of claim 8, wherein a first reverse gear ratio (R1) between drive shaft (GW1) and output shaft (GW2) is realizable by closing the first shift element (04), the seventh shift element (15) and the fifth shift element (36).

11. The transmission (G) of claim 10, wherein a second reverse gear ratio (R2) is realizable by closing the first shift element (04), the seventh shift element (15) and the fourth shift element (26).

12. The transmission (G) of claim 1, wherein the first planetary gear set (P1) is a stepped planetary gear set such that the first planetary gear set (P1) has planet gears (PL1) with a smaller effective diameter and a larger effective diameter, the sun gear (E11) of the first planetary gear set (P1) meshes with the smaller effective diameter of the planet pears (PL1), and the ring gear (E31) of the first planetary gear set (P1) meshes with the larger effective diameter of the planet gears (PL1).

13. The transmission (G) of claim 12, wherein an additional sun gear (E112) of the first planetary gear set (P1) meshes with the larger effective diameter of the planet gears (PL1), and the drive shaft (GW1) is connectable to the additional sun gear (E112) by closing an additional shift element (15b).

14. The transmission (G) of claim 13, wherein a reverse gear ratio (R1b, R2b, R3b) between the drive shaft (GW1) and the output shaft (GW2) is formable by closing the additional shift element (15b) and the second, fifth or fourth shift element (13, 36, 26).

15. The transmission (G) of claim 12, wherein an additional ring gear (E312) of the first planetary gear set (P1) meshes with the planet gears (PL1) with the smaller effective diameter, and the output shaft (GW2) is connectable to the additional ring gear (E312) by closing a further additional shift element (27).

16. The transmission (G) of claim 15, wherein eight forward gear ratios (1b-8b) between the drive shaft (GW1) and the output shaft (GW2) are engageable through selective pairwise closure of the first through fifth shift elements (04, 13, 14, 26, 36) and of the further additional shift element (27), wherein the first forward gear ratio (1b) is realized by closing the first shift element (04) and the second shift element (13), the second forward gear ratio (2b) is realized by closing the second shift element (13) and the fourth shift element (26), the third forward gear ratio (3b) is realized by closing the second shift element (13) and the further additional shift element (27), the fourth forward gear ratio (4b) is realized by closing the second shift element (13) and the fifth shift element (36), the fifth forward gear ratio (5b) is realized by closing the second shift element (13) and the third shift element (14), the sixth forward gear ratio (6b) is realized by closing the third shift element (14) and the fifth shift element (36), the seventh forward gear ratio (7b) is realized by closing the third shift element (14) and the further additional shift element (27), and the eighth forward gear ratio (8b) is realized by closing the third shift element (14) and the fourth shift element (26).

* * * * *